US011758223B2

(12) United States Patent
Woodruff et al.

(10) Patent No.: US 11,758,223 B2
(45) Date of Patent: Sep. 12, 2023

(54) APPARATUS, SYSTEMS, AND METHODS FOR USER PRESENCE DETECTION FOR AUDIENCE MONITORING

(71) Applicant: The Nielsen Company (US), LLC, New York, NY (US)

(72) Inventors: Stanley Wellington Woodruff, Palm Harbor, FL (US); John T. Livoti, Clearwater, FL (US)

(73) Assignee: The Nielsen Company (US), LLC, New York, NY (US)

( * ) Notice: Subject to any disclaimer, the term of this patent is extended or adjusted under 35 U.S.C. 154(b) by 0 days.

(21) Appl. No.: 17/561,473

(22) Filed: Dec. 23, 2021

(65) Prior Publication Data

US 2023/0209132 A1    Jun. 29, 2023

(51) Int. Cl.
*H04N 21/442* (2011.01)
*H04N 21/422* (2011.01)
*H04N 21/4223* (2011.01)
*G10L 17/22* (2013.01)

(52) U.S. Cl.
CPC ... *H04N 21/44218* (2013.01); *H04N 21/4223* (2013.01); *H04N 21/42203* (2013.01); *G10L 17/22* (2013.01)

(58) Field of Classification Search
None
See application file for complete search history.

(56) References Cited

U.S. PATENT DOCUMENTS

| | | |
|---|---|---|
| 3,805,238 A | 4/1974 | Rothfjell |
| 4,468,807 A | 8/1984 | Moulton |
| 4,611,347 A | 9/1986 | Netravali et al. |
| 4,626,904 A | 12/1986 | Lurie |
| 4,644,509 A | 2/1987 | Kiewit et al. |
| 4,658,290 A | 4/1987 | McKenna et al. |
| 4,769,697 A | 9/1988 | Gilley et al. |
| 4,779,198 A | 10/1988 | Lurie |
| 4,843,631 A | 6/1989 | Steinpichler et al. |
| 4,849,737 A | 7/1989 | Kirihata et al. |

(Continued)

FOREIGN PATENT DOCUMENTS

| | | |
|---|---|---|
| EP | 0262757 | 4/1988 |
| EP | 1133090 | 9/2001 |

(Continued)

OTHER PUBLICATIONS

Wikipedia. (Dec. 2010) "Kinect." http://en.wikipedia.org/wiki/Kinect, 15 pages.

(Continued)

*Primary Examiner* — Alexander Q Huerta

(57) ABSTRACT

Apparatus, systems, and method for user presence detection for audience monitoring are disclosed. Example apparatus disclosed herein are to detect movement of a user relative to an area based on one or more signals output by one or more motion detection sensors, the area associated with a media presentation device. Disclosed example apparatus are also to generate a request for verification of user presence in the viewing area in response to detection of the user movement. Disclosed example apparatus are further to correlate a user input responsive to the request with media presented via the media presentation device.

20 Claims, 11 Drawing Sheets

(56) References Cited

U.S. PATENT DOCUMENTS

| | | |
|---|---|---|
| 4,858,000 A | 8/1989 | Lu |
| 4,993,049 A | 2/1991 | Cupps |
| 5,031,228 A | 7/1991 | Lu |
| 5,063,603 A | 11/1991 | Burt |
| 5,067,160 A | 11/1991 | Omata et al. |
| 5,097,328 A | 3/1992 | Boyette |
| 5,099,324 A | 3/1992 | Abe |
| 5,121,201 A | 6/1992 | Seki |
| 5,144,797 A | 9/1992 | Swars |
| 5,164,992 A | 11/1992 | Turk et al. |
| 5,229,764 A | 7/1993 | Matchett et al. |
| 5,331,544 A | 7/1994 | Lu et al. |
| 5,373,315 A | 12/1994 | Dufresne et al. |
| 5,384,716 A | 1/1995 | Araki et al. |
| 5,412,738 A | 5/1995 | Brunelli et al. |
| 5,481,622 A | 1/1996 | Gerhardt et al. |
| 5,497,185 A | 3/1996 | Dufresne et al. |
| 5,550,928 A | 8/1996 | Lu et al. |
| 5,629,752 A | 5/1997 | Kinjo |
| 5,675,663 A | 10/1997 | Koerner et al. |
| 5,715,325 A | 2/1998 | Bang et al. |
| 5,719,951 A | 2/1998 | Shackleton et al. |
| 5,771,307 A | 6/1998 | Lu et al. |
| 5,781,650 A | 7/1998 | Lobo et al. |
| 5,793,409 A | 8/1998 | Tetsumura |
| 5,801,763 A | 9/1998 | Suzuki |
| 5,805,745 A | 9/1998 | Graf |
| 5,835,616 A | 11/1998 | Lobo et al. |
| 5,850,470 A | 12/1998 | Kung et al. |
| 5,859,921 A | 1/1999 | Suzuki |
| 5,864,630 A | 1/1999 | Cosatto et al. |
| 5,878,156 A | 3/1999 | Okumura |
| 5,892,837 A | 4/1999 | Luo et al. |
| 5,901,244 A | 5/1999 | Souma et al. |
| 5,920,641 A | 7/1999 | Ueberreiter et al. |
| 5,963,670 A | 10/1999 | Lipson et al. |
| 5,978,507 A | 11/1999 | Shackleton et al. |
| 5,987,154 A | 11/1999 | Gibbon et al. |
| 6,014,461 A | 1/2000 | Hennessey et al. |
| 6,032,106 A | 2/2000 | Ishii |
| 6,047,134 A | 4/2000 | Sekine et al. |
| 6,055,323 A | 4/2000 | Okumura |
| 6,144,797 A | 11/2000 | MacCormack et al. |
| 6,332,033 B1 | 12/2001 | Qian |
| 6,332,038 B1 | 12/2001 | Funayama et al. |
| 6,363,159 B1 | 3/2002 | Rhoads |
| 6,507,391 B2 | 1/2003 | Riley et al. |
| 6,625,316 B1 | 9/2003 | Maeda |
| 6,940,545 B1 | 9/2005 | Ray et al. |
| 6,944,319 B1 | 9/2005 | Huang et al. |
| 7,035,467 B2 | 4/2006 | Nicponski |
| 7,043,056 B2 | 5/2006 | Edwards et al. |
| 7,134,130 B1 | 11/2006 | Thomas |
| 7,155,159 B1 | 12/2006 | Weinblatt et al. |
| 7,158,177 B2 | 1/2007 | Kage et al. |
| 7,203,338 B2 | 4/2007 | Ramaswamy et al. |
| 7,440,593 B1 | 10/2008 | Steinberg et al. |
| 7,466,844 B2 | 12/2008 | Ramaswamy et al. |
| 7,602,524 B2 | 10/2009 | Eichhorn et al. |
| 7,609,853 B2 * | 10/2009 | Ramaswamy ..... H04N 7/17309 382/168 |
| 7,636,456 B2 | 12/2009 | Collins et al. |
| 7,676,065 B2 | 3/2010 | Wiedemann et al. |
| 7,697,735 B2 | 4/2010 | Adam et al. |
| 7,796,154 B2 | 9/2010 | Senior et al. |
| 7,899,209 B2 | 3/2011 | Greiffenhagen et al. |
| 8,194,923 B2 | 6/2012 | Ramaswamy et al. |
| 8,620,088 B2 | 12/2013 | Lee |
| 8,660,308 B2 | 2/2014 | Ramaswamy et al. |
| 8,824,740 B2 | 9/2014 | Ramaswamy et al. |
| 9,020,780 B2 | 4/2015 | Zhang et al. |
| 9,082,004 B2 | 7/2015 | Nielsen |
| 9,426,525 B2 | 8/2016 | Soundararajan et al. |
| 9,560,267 B2 | 1/2017 | Nielsen |
| 9,609,385 B2 * | 3/2017 | Hicks ............... H04N 21/44218 |
| 9,843,717 B2 | 12/2017 | Nielsen |
| 10,165,177 B2 | 12/2018 | Nielsen |
| 10,966,007 B1 | 3/2021 | Fenner et al. |
| 11,232,688 B1 * | 1/2022 | Lemberger ....... G08B 13/19652 |
| 11,245,839 B2 | 2/2022 | Nielsen |
| 11,470,243 B2 | 10/2022 | Nielsen |
| 2002/0198762 A1 * | 12/2002 | Donato ................. H04H 60/45 725/24 |
| 2003/0033600 A1 | 2/2003 | Cliff et al. |
| 2003/0081834 A1 | 5/2003 | Philomin et al. |
| 2003/0093784 A1 | 5/2003 | Dimitrova et al. |
| 2004/0122679 A1 | 6/2004 | Neuhauser et al. |
| 2004/0220753 A1 | 11/2004 | Tabe |
| 2005/0117783 A1 | 6/2005 | Sung et al. |
| 2005/0144632 A1 | 6/2005 | Mears et al. |
| 2005/0198661 A1 | 9/2005 | Collins et al. |
| 2006/0062429 A1 | 3/2006 | Ramaswamy et al. |
| 2006/0133699 A1 | 6/2006 | Widrow et al. |
| 2006/0200841 A1 | 9/2006 | Ramaswamy et al. |
| 2007/0121959 A1 | 5/2007 | Philipp |
| 2007/0150916 A1 | 6/2007 | Begole et al. |
| 2007/0154063 A1 | 7/2007 | Breed |
| 2007/0263934 A1 | 11/2007 | Ojima et al. |
| 2007/0294126 A1 | 12/2007 | Maggio |
| 2008/0091510 A1 | 4/2008 | Crandall et al. |
| 2008/0232650 A1 | 9/2008 | Suzuki et al. |
| 2008/0243590 A1 | 10/2008 | Rich |
| 2008/0271065 A1 | 10/2008 | Buonasera et al. |
| 2009/0070797 A1 | 3/2009 | Ramaswamy et al. |
| 2009/0091650 A1 | 4/2009 | Kodama |
| 2009/0133058 A1 | 5/2009 | Kouritzin et al. |
| 2009/0177528 A1 | 7/2009 | Wu et al. |
| 2009/0265729 A1 | 10/2009 | Weinblatt |
| 2009/0290756 A1 | 11/2009 | Ramaswamy et al. |
| 2009/0307084 A1 | 12/2009 | Monighetti et al. |
| 2009/0310829 A1 | 12/2009 | Baba et al. |
| 2010/0124274 A1 | 5/2010 | Cheok et al. |
| 2010/0245567 A1 | 9/2010 | Krahnstoever et al. |
| 2011/0019924 A1 | 1/2011 | Elgersma et al. |
| 2011/0023060 A1 * | 1/2011 | Dmitriev ............ H04N 21/6582 705/14.66 |
| 2011/0137721 A1 | 6/2011 | Bansal |
| 2011/0164188 A1 | 7/2011 | Karaoguz et al. |
| 2011/0169953 A1 | 7/2011 | Sandler et al. |
| 2011/0265110 A1 | 10/2011 | Weinblatt |
| 2011/0285845 A1 | 11/2011 | Bedros et al. |
| 2012/0081392 A1 | 4/2012 | Arthur |
| 2012/0151079 A1 | 6/2012 | Besehanic et al. |
| 2013/0013396 A1 | 1/2013 | Vinson et al. |
| 2013/0129159 A1 | 5/2013 | Huijgens et al. |
| 2013/0152113 A1 | 6/2013 | Conrad et al. |
| 2013/0156273 A1 | 6/2013 | Nielsen |
| 2013/0229518 A1 | 9/2013 | Reed et al. |
| 2014/0052405 A1 | 2/2014 | Wackym |
| 2014/0254880 A1 * | 9/2014 | Srinivasan ................. G06T 7/70 382/106 |
| 2014/0366123 A1 | 12/2014 | DiBona et al. |
| 2015/0057964 A1 | 2/2015 | Albinali |
| 2015/0057967 A1 | 2/2015 | Albinali |
| 2015/0271390 A1 | 9/2015 | Nielsen |
| 2016/0037209 A1 * | 2/2016 | Miyoshi .............. H04N 21/4223 725/85 |
| 2016/0065902 A1 * | 3/2016 | Deng ..................... H04H 60/31 348/77 |
| 2016/0261911 A1 * | 9/2016 | Soundararajan ... H04N 21/4223 |
| 2017/0142330 A1 | 5/2017 | Nielsen |
| 2018/0048807 A1 | 2/2018 | Nielsen |
| 2018/0089898 A1 | 3/2018 | Huddy |
| 2018/0268865 A1 | 9/2018 | Ekambaram et al. |
| 2018/0285634 A1 | 10/2018 | Varadarajan et al. |
| 2019/0089894 A1 | 3/2019 | Nielsen |
| 2019/0287052 A1 | 9/2019 | Sundar et al. |
| 2019/0287380 A1 | 9/2019 | Verbeke et al. |
| 2019/0295393 A1 * | 9/2019 | Lee .................. G08B 13/19691 |
| 2019/0325228 A1 * | 10/2019 | Chaudhry ............ G06K 9/6219 |
| 2020/0265835 A1 | 8/2020 | Ni |
| 2020/0275835 A1 | 9/2020 | Chintala et al. |
| 2020/0296463 A1 * | 9/2020 | Martinez ............ G06Q 30/0246 |
| 2020/0351436 A1 | 11/2020 | Nielsen |

(56) References Cited

U.S. PATENT DOCUMENTS

| | | | |
|---|---|---|---|
| 2020/0364885 | A1 | 11/2020 | Latapie et al. |
| 2020/0374491 | A1* | 11/2020 | DeAngelus ............ G06V 20/52 |
| 2021/0000403 | A1 | 1/2021 | Xu et al. |
| 2021/0133483 | A1 | 5/2021 | Prabhu et al. |
| 2021/0281943 | A1 | 9/2021 | Lehnert |
| 2021/0319782 | A1 | 10/2021 | Gong et al. |
| 2021/0327243 | A1 | 10/2021 | Franco et al. |
| 2021/0374394 | A1* | 12/2021 | Livoti .............. H04N 21/44218 |
| 2021/0400427 | A1 | 12/2021 | Burowski et al. |
| 2021/0409844 | A1 | 12/2021 | Livoti et al. |
| 2022/0052867 | A1 | 2/2022 | Nakano et al. |
| 2022/0171466 | A1 | 6/2022 | Zhang et al. |
| 2022/0279243 | A1* | 9/2022 | Watts ................. H04N 21/4753 |
| 2023/0047888 | A1 | 2/2023 | Christian et al. |

FOREIGN PATENT DOCUMENTS

| | | |
|---|---|---|
| WO | 9605571 | 2/1996 |
| WO | 9927668 | 6/1999 |
| WO | 2004053791 | 6/2004 |
| WO | 2004054255 | 6/2004 |

OTHER PUBLICATIONS

United States Patent and Trademark Office, "Non-Final Office Action," issued in connection with U.S. Appl. No. 17/403,461, dated Jul. 22, 2022, 10 pages.

"Infrared Person Tracking," IBM ECVG, retrieved May 6, 2009 from http://www.research.ibm.com/ecvg/misc/footprint.html, last updated Jun. 12, 2002, 2 pages.

Duncan Graham-Rowe, "Hot Shopping," New Scientist Magazine, Issue 2230, Mar. 18, 2000, p. 12, retrieved from http://www.newscientist.com/article.ns?id=mg16522301.700&print=true.

Duda et al., "Pattern Classification and Scene Analysis," Chapter 2, Bayes Decision Theory, Stanford Research institute, Menlo Park, CA, 1973, 19 pages.

Qing et al., "Histogram Based Fuzzy C-Mean Algorithm for Image Segmentation," Zhejiang University, IEEE, 1992, 4 pages.

Gudino, Miguel, "How do Motion Sensors Work? Types of Motion Sensors," Arrow Electronics, https://www.arrow.com/en/research-and-events/articles/how-motion-sensors-work, Feb. 1, 2018, 5 pages.

United States Patent and Trademark Office, "Non-Final Office Action," issued in connection with U.S. Appl. No. 17/175,354, dated Jan. 20, 2023, 5 pages.

United States Patent and Trademark Office, "Final Office Action," issued in connection with U.S. Appl. No. 17/403,461, dated Jan. 31, 2023, 12 pages.

Teixeira et al., A Survey of Human-Sensing: Methods for Detecting Presence, Count, Location, Track, and Identity, ENALAB Technical Report Sep. 2010, vol. 1, No. 1, Sep. 2010, 41 pages.

United States Patent and Trademark Office, "Advisory Action," issued in connection with U.S. Appl. No. 17/403,461, dated May 23, 2023, 3 pages.

* cited by examiner

US 11,758,223 B2

APPARATUS, SYSTEMS, AND METHODS FOR USER PRESENCE DETECTION FOR AUDIENCE MONITORING

FIELD OF THE DISCLOSURE

This disclosure relates generally to audience monitoring and, more particularly, to apparatus, systems, and methods for user presence detection for audience monitoring.

BACKGROUND

Media providers as well as advertising companies, broadcasting networks, etc., are interested in viewing behavior of audience members. Media usage and/or exposure habits of audience members in a household can be obtained using a metering device associated with a media presentation device.

BRIEF DESCRIPTION OF THE DRAWINGS

In general, the same reference numbers will be used throughout the drawing(s) and accompanying written description to refer to the same or like parts. The figures are not to scale.

Figure 1:
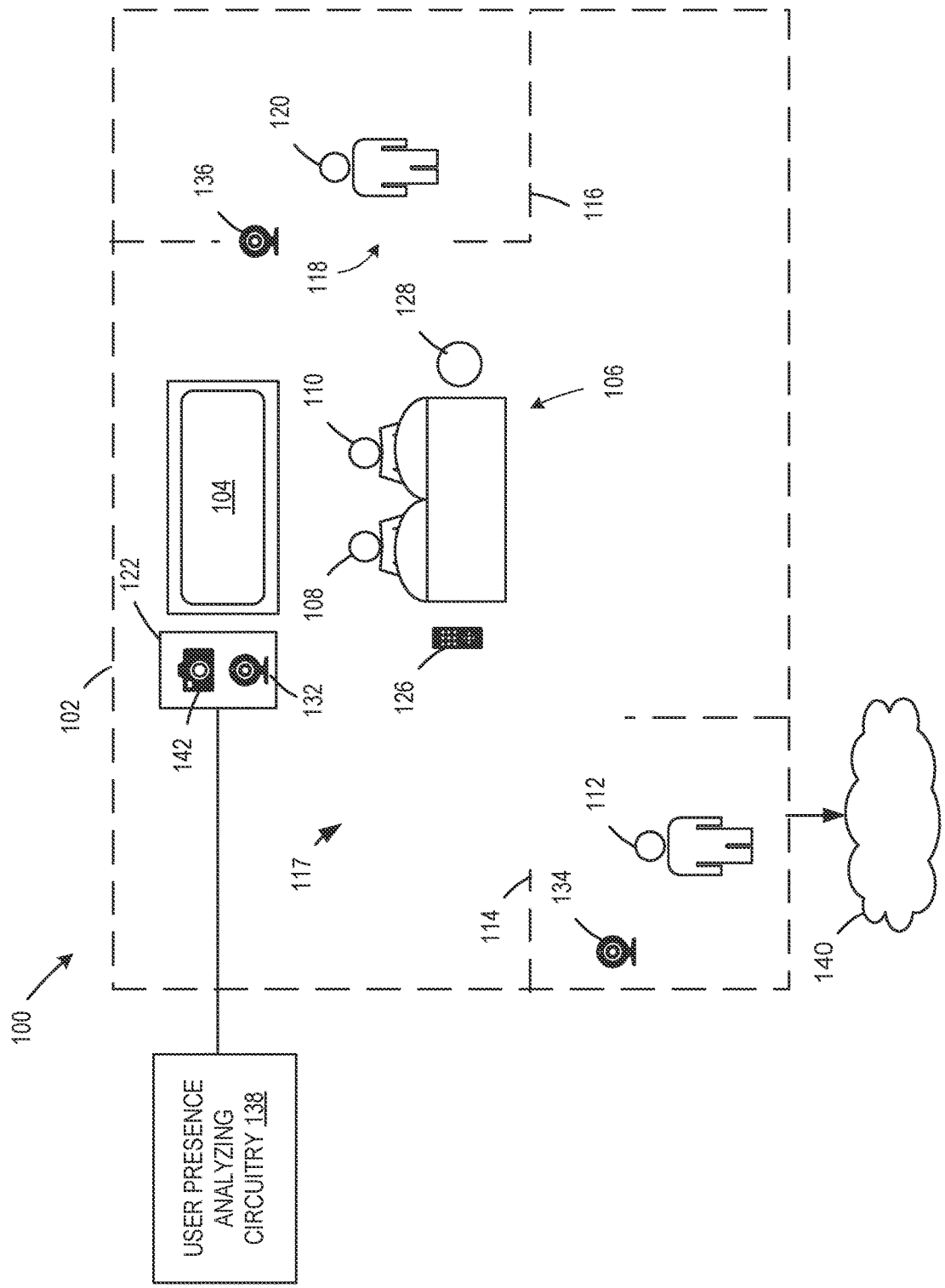
FIG. 1 illustrates an example audience monitoring system including an example metering device, one or more motion sensors, and user presence analyzing circuitry for verifying presence of audience members in response to data generated by the motions sensors in accordance with teachings of this disclosure.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

As used herein, "processor circuitry" is defined to include (i) one or more special purpose electrical circuits structured to perform specific operation(s) and including one or more semiconductor-based logic devices (e.g., electrical hardware implemented by one or more transistors), and/or (ii) one or more general purpose semiconductor-based electrical circuits programmed with instructions to perform specific operations and including one or more semiconductor-based logic devices (e.g., electrical hardware implemented by one or more transistors). Examples of processor circuitry include programmed microprocessors, Field Programmable Gate Arrays (FPGAs) that may instantiate instructions, Central Processor Units (CPUs), Graphics Processor Units (GPUs), Digital Signal Processors (DSPs), XPUs, or microcontrollers and integrated circuits such as Application Specific Integrated Circuits (ASICs). For example, an XPU may be implemented by a heterogeneous computing system including multiple types of processor circuitry (e.g., one or more FPGAs, one or more CPUs, one or more GPUs, one or more DSPs, etc., and/or a combination thereof) and application programming interface(s) (API(s)) that may assign computing task(s) to whichever one(s) of the multiple types of the processing circuitry is/are best suited to execute the computing task(s).

DETAILED DESCRIPTION

There is a desire to monitor behavior of users of a media presentation device, such as a television, to verify user presence during operation of the media presentation device and, thus, exposure to (e.g., viewing of) content presented by the media presentation device. In some known examples, users (e.g., audience members) of the media presentation device are prompted to enter viewing panel information (e.g., user identification information) at predefined intervals, such as every 42 minutes, during presentation of the media content. However, within this time interval, one or more users may have left a viewing area in which the media presentation device is located (e.g., a living room) and returned prior to a subsequent request for viewing panel data. For instance, an audience member may leave a room in a house where the television is located and return after some time. Therefore, periodic interval checks for viewing panel information can result in inaccurate and/or incomplete viewing information because one or more of the users may have left the viewing area within the interval and, thus, were not actually exposed to some amount of the content. Thus, prompts to verify user presence at predefined intervals may not capture changes in the presence of the user(s) between the intervals.

Also, in some instances, audience member(s) may view media content for an extended period of time (e.g., two hours) without leaving the viewing area, such as when watching a movie. In such instances, prompting the user(s) for identification at regular intervals (e.g., every 42 minutes)

may be an annoyance and, as a result, decrease audience compliance in providing accurate viewing panel information. For example, a user may only enter identification information for one of the users in an effort to return to the movie quickly when, in actuality, there are three viewers present.

Example systems, methods, apparatus, and articles of manufacture disclosed herein identify (e.g., predict, detect, etc.) change(s) with respect to movement of user(s) relative to a viewing area (or, more generally, a media exposure area) including a media presentation device (e.g., a television) and generate prompts to verify the presence of the audience member(s). Examples disclosed herein analyze signals output by motion sensors located in the viewing area and/or at other locations within an environment (e.g., a house) that includes the viewing area. In examples disclosed herein, the signals output by the motion sensors are analyzed to detect user movement relative to the viewing area and to identify (e.g., predict) instances in which user(s) have entered or left the viewing area. Some examples disclosed herein generate a timestamp associated with the movement(s) of the user(s) relative to the viewing area. The timestamp(s) associated with user movement(s) can be correlated with the presentation of media content to identify instances in which a user was not likely to have viewed (or, more generally, have been exposed to) certain media content (e.g., a commercial) because the user was not in the viewing area during presentation of that content. The timestamped information can be used by media providers to determine viewing metrics for content presented at the time(s) corresponding to the timestamp(s) more accurately.

Examples disclosed herein provide for on-demand prompts for user presence verification in response to changes in movement detected from the motion sensor data analysis. In response to detecting a change in user movement relative to the viewing area, some examples disclosed herein communicate with one or more devices (e.g., a metering device, a media presentation device, a smart home device, etc.) to cause the device(s) to output request(s) to obtain viewing panel information. For example, in response to the detection of movement, examples disclosed herein can cause a device, such as a metering device associated with the media presentation device, to generate an indicator (e.g., a flashing light indicator) to prompt the user(s) to enter viewing panel identification information via a remote control device. Some examples disclosed herein communicate with a smart home device to cause the smart home device to output an audio command to prompt the user for identification information and to detect audio input(s) from the user.

Some examples disclosed herein provide for passive verification of user presence by collecting and analyzing image data including the viewing area. Some examples disclosed activate image sensor(s) (e.g., camera(s)) to generate image data of the viewing area in response to a detection of change(s) in user movement. In some such examples, facial recognition analysis can be used to automatically identify the user(s) present in the viewing area rather than relying on manual entry of panelist information.

Examples disclosed herein provide for dynamic user presence detection and verification, which provides for improved accuracy in monitoring audience viewing behavior. The user input(s) verifying the presence of the audience member(s) can be used to calibrate sensitivity level(s) of the motion sensors in detecting movement to reduce instances of false positives, such as a pet entering or leaving the viewing area or a panelist who is, for example, adjusting his or her sitting position on a couch rather than leaving the viewing area.

Although examples disclosed herein are discussed in connection with viewing media, disclosed examples apply to monitoring media exposure more generally. Thus, although examples disclosed herein refer to, for instance, a viewing area, examples disclosed herein more generally apply to a media exposure area. Examples disclosed herein apply to, for instance, television monitoring, audio/radio monitoring, and/or other types of media exposure.

FIG. 1 illustrates an example audience monitoring system 100 constructed in accordance with teachings of this disclosure. In this example, the audience monitoring system 100 is implemented in a house 102. However, the audience monitoring system 100 can be implemented in other environments.

The example system 100 of FIG. 1 includes an example media presentation device 104. In the example of FIG. 1, the media presentation device 104 is a television. The media presentation device 104 can include other types of media presentation devices and/or electronic user devices (e.g., a personal computer). In operation, the media presentation device 104 presents content such as television shows, movies, commercials, etc. The example of FIG. 1 can include additional media presentation devices 104.

In the illustrated example, the media presentation device 104 is located in an example primary media exposure area or a primary viewing area 106 (e.g., a living room) of the house 102. For example, as illustrated in FIG. 1, an example first user 108 and an example second user 110 can view the media presentation device 104 while in the primary viewing area 106. In some examples, the media presentation device 104 is at least partially visible to an example third user 112 who is located in an example secondary viewing area 114 of the house 102. The secondary viewing area 114 can be, for example, an office or kitchen space adjacent to the primary viewing area 106 (e.g., the living room) from which at least a portion of the media presentation device 104 and, thus, the content presented thereby, is visible to the third user 112. The example house 102 of FIG. 1 can include additional or fewer viewing areas.

In the example of FIG. 1, the house 102 includes an example non-viewing area 116, or an area from which the media presentation device 104 is not viewable or otherwise accessible. In the example of FIG. 1, an example passageway 118 separates the primary viewing area 106 and the non-viewing area 116. As shown in FIG. 1, an example fourth user 120 is located in the non-viewing area 116. The first, second, third, and fourth users 108, 110, 112, 120 of the house 102 define an example household 117.

The example system 100 of FIG. 1 includes one or more example metering devices 122, such as a Global Television Audience Metering (GTAM) meter, an Active/Passive (A/P) meter, etc., communicatively coupled to, or otherwise structured to monitor, the media presentation device 104. The metering device 122 may be a standalone device proximate (e.g., within a few feet of) to the media presentation device 104. In other examples, the metering device 122 may be coupled to (e.g., carried by) the media presentation device 104. In some examples, the metering device 122 is integrated into the media presentation device 104.

The metering device 122 has a unique identifier (ID) and is associated with a household ID for the household 117. The metering device 122 generates and collects signatures and/or watermarks from the media presentation device 104. The signatures and/or watermarks can be used to determine the specific media content (e.g., a TV show, a movie, a commercial, etc.) to which the metering device 122 was exposed and, thus, the audience exposed to the media. This information can be used to generate, for example, ratings and/or ranking reports that may be provided to, for instance, media and/or advertising providers.

In the example of FIG. 1, the first, second, third, and fourth members 108, 110, 112, 120 of the household 117 are each assigned a user identifier that is used to determine which member(s) 108, 110, 112, 120 are consuming media presented by the media presentation device 104 at a particular time. The user identifiers may be, for example, a numerical code representative of the user 108, 110, 112, 120; the first name of the user 108, 110, 112, 120, etc. In some examples, the user identifier is associated with demographic information (e.g., location, age, gender, etc.) for each user 108, 110, 112, 120 (e.g., age, gender, etc.). In the example of FIG. 1, the user(s) 108, 110, 112, 120 provide their respective user identifier(s) when interacting with (e.g., viewing) the media presentation device 104. In examples disclosed herein, the user(s) 108, 110, 112, 120 can provide their corresponding user identifiers via an example remote control device 126 and/or by providing audio input(s) via an example smart home device 128 (e.g., an Amazon® Echo device).

When the media presentation device 104 is presenting content, one or more of the users 108, 110, 112, 120 may enter or exit the primary viewing area 106. For instance, the first user 108 may move from the primary viewing area 106 to the non-viewing area 116 via the passageway 118. As another example, the third user 112 may move from the secondary viewing area 114 into the primary viewing area 106. Thus, respective ones of the users 108, 110, 112, 120 may be exposed to the content presented via the media presentation device 104 at different times and/or for varying durations of time.

The example system 100 of FIG. 1 includes one or more motion sensors to detect movement by the user(s) 108, 110, 112, 120 relative to the primary viewing area 106. In the illustrated example, the system 100 includes an example first motion sensor 132 in the primary viewing area 106, an example second motion sensor 134 in the secondary viewing area 114, and an example third motion sensor 136 at the passageway 118 between the primary viewing area 106 and the non-viewing area 116. The motion sensors 132, 134, 136 can include, for instance, infrared sensors or passive infrared (PIR) sensors. A PIR sensor detects changes in infrared radiation (e.g., heat energy) within a field of view of the sensor. Each of the first, second, and/or third motion sensors 132, 134, 136 can include one or more motion sensors to form a mesh network in the house 102. The example system 100 of FIG. 1 can include additional or fewer motion sensors than shown in FIG. 1 and/or different types of sensors (e.g., microwave motion detectors). Also, the location(s) of the motion sensor(s) 132, 134, 136 can differ from the examples shown in FIG. 1.

The example first motion sensor 132 detects movement within a field of view that includes at least a portion of the primary viewing area 106.

For instance, the first motion sensor 132 can have a 150° field of view. In some examples, the first motion sensor 132 is carried by the metering device 122 (e.g., removably coupled thereto, built-in). The example second motion sensor 134 detects movement within a field of view that includes at least a portion of the secondary viewing area 114. The example third motion sensor 136 detects movement within a field of view that includes the passageway 118 between the primary viewing area 106 and the non-viewing area 116. In some examples, the fields of view of two or more of the motion sensors 132, 134, 136 may overlap. For instance, the field of view of the third motion sensor 136 located at the passageway 118 can detect movement in at least a portion of the primary viewing area 106.

In some examples, the motions sensor(s) 132, 134, 136 include a Fresnel lens that divides the respective fields of view of the motion sensor(s) 132, 134, 136 into sub-sections or grids. For instance, each of the sub-sections of the field of view of the first motion sensor 132 capture regions or portions of the primary viewing area 106. In such examples, motion can be tracked across the sub-sections of the field of view of the first motion sensor 132 to track movement across the primary viewing area 106.

The example system 100 includes example user presence analyzing circuitry 138 to analyze the signals output by one or more of the motion sensors 132, 134, 136, to detect (e.g., predict) changes in movement of the user(s) 108, 110, 112, 120 relative to the primary viewing area 106 and to generate requests for user identification in response to the detected movement to verify the audience viewing panel. The user presence analyzing circuitry 138 can be implemented by processor circuitry (e.g., semiconductor-based hardware logic device(s)) of the metering device 122 and/or another example user device (e.g., the smart home device 128, a smartphone, etc.). In some examples, the user presence analyzing circuitry 138 can be implemented by, for example, an example cloud-based device 140 (e.g., one or more server(s), processor(s), and/or virtual machine(s)), etc. Signals output by the sensor(s) 132, 134, 136 can be transmitted to the user presence analyzing circuitry 138 via one or more wired or wireless communication protocols (e.g., WiFi, Bluetooth®).

The user presence analyzing circuitry 138 analyzes the signals output by the motion sensor(s) 132, 134, 136 to determine (e.g., predict, recognize) if any of the user(s) 108, 110, 112, 120 have entered or left the primary viewing area 106. In response to detection of a change in movement relative to the primary viewing area 106, the user presence analyzing circuitry 138 generates a request to verify which user(s) 108, 110, 112, 120 are present in the primary viewing area 106. The user presence analyzing circuitry 138 causes one or more devices (e.g., the media presentation device 104, the smart home device 128) to output the request or prompt to verify which user(s) 108, 110, 112, 120 are present in the primary viewing area 106.

In the example of FIG. 1, the user presence analyzing circuitry 138 identifies changes in movement relative to the primary viewing area 106 based on rule(s) and/or threshold(s) indicative of changes in user presence. For example, the rule(s) can define that if the third sensor 136 outputs signal data indicative of movement at the passageway 118, then the user presence analyzing circuitry 138 should initiate the user verification prompt. In particular, because of the location of the third sensor 136 at the passageway 118, the user presence analyzing circuitry 138 determines that the signals output by the third sensor 136 are indicative of one or more users 108, 110, 112, 120 entering or leaving the primary viewing area 106.

As another example, the user presence analyzing circuitry 138 can access signals output by the first sensor 132 indicative of motion detected in the primary viewing area 106. However, such movement may be indicative of movement of one of the users 108, 110, 112, 120 within the primary viewing area 106 rather than, for instance, entering or leaving the primary viewing area 106. In such instance, the rule(s) can define that if a combination of the first sensor 132 and either the second sensor 134 or the third sensor 136 output signals indicative of movement within a threshold period of time, then the user presence analyzing circuitry 138 should generate the request for verification of user presence. However, if the user presence analyzing circuitry 138 detects movement within the primary viewing area 106 but does not detect movement based on signals from the second sensor 134 or the third sensor 136 within the threshold period of time, then the user presence analyzing circuitry 138 does not generate the request for user presence verification (e.g., to avoid disturbing the user(s) 108, 110, 112, 120 when moving within the primary viewing area 106 to, for instance, adjust a seating position).

In some examples, to verify user presence, the user presence analyzing circuitry 138 causes a flash indicator (e.g., a light emitting diode) of the metering device 122 to operate to prompt the user(s) 108, 110, 112, 120 to enter the user identifier(s) via, for instance, the remote control device 126. In some examples, the user presence analyzing circuitry 138 causes a message to be displayed via the media presentation device 104. The message can include a request or prompt for the user(s) 108, 110, 112, 120 to enter his or her user identifier (e.g., panelist number, name) via, for instance, the remote control device 126. In some examples, the message can include selection(s) to indicate whether the respective user(s) 108, 110, 112, 120 started watching the media content, stopped watching the media content, left the primary viewing area 106 temporarily, etc., or to indicate that there was no change in user presence.

In some examples, the user(s) 108, 110, 112, 120 can respond to the request for verification via the smart home device 128. For example, the user(s) 108, 110, 112, 120 can respond to the verification message displayed by the media presentation device 104 by providing speech input(s) that are detected by the smart home device 128. In some examples, in addition to or an as alternative to the verification message presented via the media presentation device 104, the user presence analyzing circuitry 138 can cause the smart home device 128 to output audio corresponding to the requests (e.g., an audio request to enter user identifier(s)). The user(s) 108, 110, 112, 120 can respond to the audio request(s) by providing speech input(s) that are detected by the smart home device 128.

In some examples, the metering device 122 includes one or more image sensors 142 (e.g., camera(s)). The image sensors 142 generate image data of at least a portion of the primary viewing area 106. In some examples, if the user presence analyzing circuitry 138 detects movement based on the signals output by the motion sensor(s) 132, 134, 136, the user presence analyzing circuitry 138 instructs the image sensor(s) 142 to generate image data of the primary viewing area 106. For privacy purposes, the image sensor(s) 142 and/or the metering device 122 can include flash indicator(s) to alert individuals (e.g., the users 108, 110, 112, 120) in the primary viewing area 106 that the image sensor(s) 142 are capturing images.

The user presence analyzing circuitry 138 analyzes the user input(s) received via the remote control device 126 and/or the smart home device 128 and/or the image data generated by the image sensor(s) 142 to determine the user(s) 108, 110, 112, 120 present in the primary viewing area 106 at a particular time. For example, the user presence analyzing circuitry 138 can perform facial recognition analysis to identify the user(s) 108, 110, 112, 120 in the primary viewing area based on the image data generated by the image sensor(s) 142.

In some examples, the user presence analyzing circuitry 138 can correlate the user identification information with signatures and/or watermarks, etc. of the particular media content presented via the media presentation device 104 and captured by the metering device 122 to identify the users who were present during presentation of particular media content. In some examples, the user presence analyzing circuitry 138 assigns timestamps to the signals output by the motion sensor(s) 132, 134, 136. The user presence analyzing circuitry 138 can correlate the timestamps with the presentation of the media content and user inputs indicating that, for instance, a user temporarily left the primary viewing area 106 to determine which content the particular user was exposed to during operation of the media presentation device 104 and which content the user may have missed because he or she was not in the primary viewing area 106 when the content was presented. The user presence information can be stored in a database for access by, for instance, by a media broadcaster. The data generated by the user presence analyzing circuitry 138 in connection with the data generated by the metering device 122 can be used to determine the media presented to the member(s) 108, 110, 112, 120 of the household 117, which media each individual user 108, 110, 112, 120 was exposed to, a duration of time for which the user(s) 108, 110, 112, 120, were exposed, etc.

In some examples, the user input(s) received via the device(s) 126, 128 and/or the results of the image data analysis using the image data generated by the image sensor(s) 142 can be used to calibrate the motion sensor(s) 132, 134, 136 with respect to outputting signals indicative of motion. For example, the first sensor 132 can be calibrated to ignore changes in infrared energy below a threshold based on user inputs indicating that none of the user(s) 108, 110, 112, 120 left the primary viewing area in response to verification prompt(s). In some examples, the user presence analyzing circuitry 138 can selectively generate the verification requests based on correlations between the motion sensor data and the user input(s). For examples, the user presence analyzing circuitry 138 can learn over time that a user presence verification request should be generated in response to movement detected by the third sensor 136 (at the passageway 118) but not in response to repeated movement detected by the second sensor 134 within a threshold period of time (e.g., based on user inputs indicating that the user(s) 108, 110, 112, 120 did not stop watching the media content despite moving between the primary viewing area 106 and the secondary viewing area 114). Thus, the user presence analyzing circuitry 138 refines the output of the user presence verification prompts over time to reduce the number of unwanted or unnecessary prompts.

Figure 2:
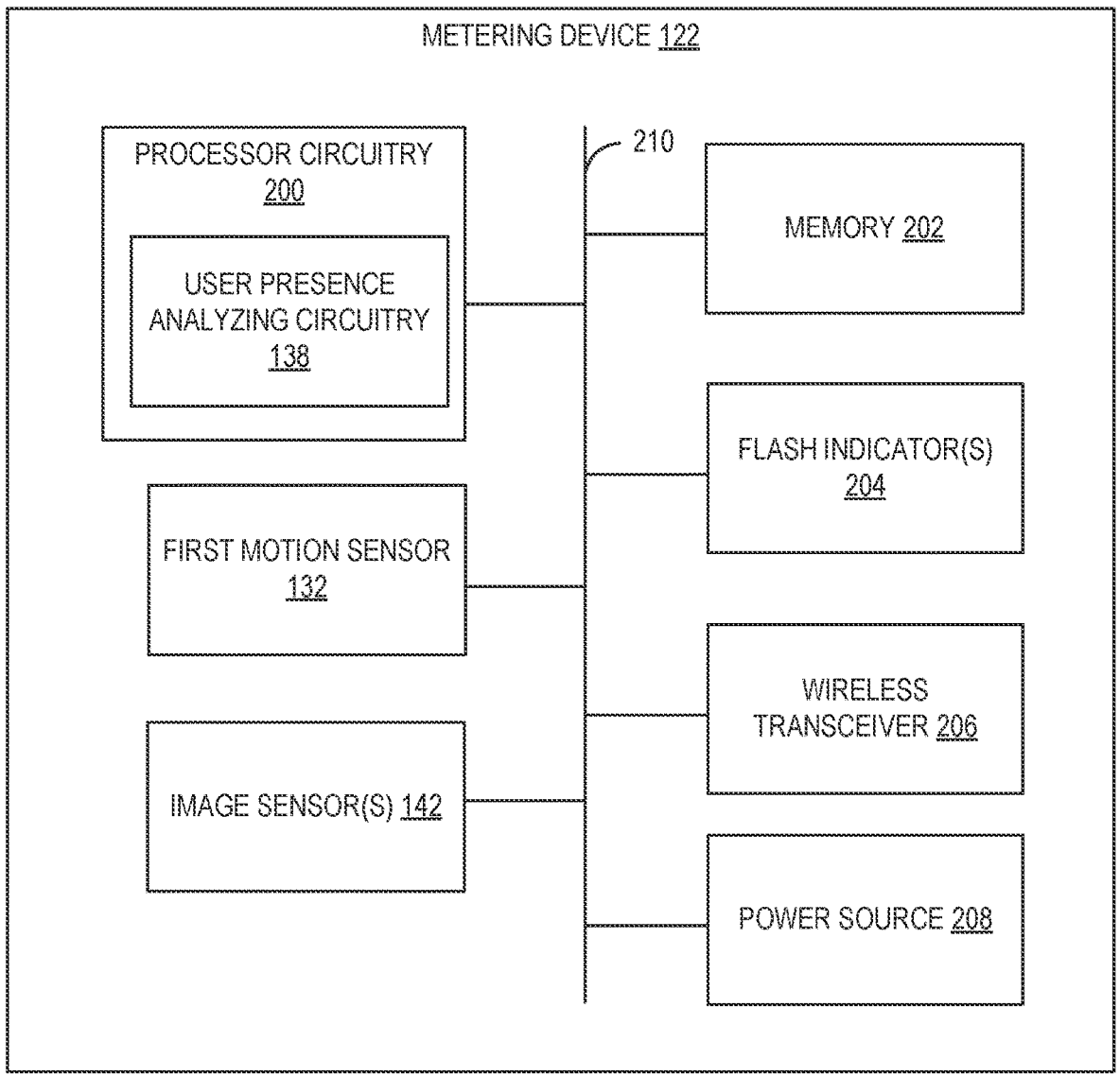
FIG. 2 is a block diagram of an example implementation of the metering device of FIG. 1.

FIG. 2 is a block diagram of the example metering device 122 of FIG. 1. In the illustrated example, the metering device 122 includes example processor circuitry 200, example memory 202, an example flash indicator 204, an example wireless transceiver 206, and an example power source 208. The power source 208, which can be, for instance, a battery and/or transformer and AC/DC converter, provides power to the processor circuitry 200 and/or other components of the metering device 122 communicatively coupled via an example bus 210.

The example memory 202 of FIG. 2 can store identifying information for the metering device 122, other devices in the example system 100 of FIG. 1 (e.g., media presentation device 104), known user identifiers for the user(s) 108, 110, 112, 120 (e.g., first names, panelist identifiers, etc.), and/or the media signatures and/or watermarks (e.g., codes) collected by the metering device 122.

The example metering device 122 of FIG. 2 includes the first motion sensor 132 (i.e., one or more motion sensors) and the image sensor(s) 142. In some examples, the first motion sensor 132 and/or the image sensor(s) 142 are disposed in a housing of the metering device 122. However, in some examples, the first motion sensor 132 and/or the image sensor(s) 142 are external to the housing of the metering device 122 (e.g., externally coupled thereto, coupled via wired and/or wireless connections, etc.).

The wireless transceiver 206 of the example metering device 122 can communicate with the remote control device 126 (FIG. 1) to detect input(s) entered via the remove control device 126.

In the example of FIG. 2, the user presence analyzing circuitry 138 is implemented by the processor circuitry 200 of the metering device 122. The processor circuitry 200 of the illustrated example is a semiconductor-based hardware logic device. However, in some examples, the user presence analyzing circuitry 138 can be implemented by, for example, processor circuitry of the smart home device 128 and/or another user device (e.g., a smartphone), the example cloud-based device 140 (e.g., one or more server(s), processor(s), and/or virtual machine(s)), etc.

The flash indicator 204 of the example metering device 122 of FIG. 2 can include, for instance, one or more light emitting diodes (LEDs). As disclosed herein, the user presence analyzing circuitry 138 can instruct the flash indicator 204 to operate (e.g., emit light, blink) to notify the user(s) 108, 110, 112, 120 of a pending request for user identification. The user presence analyzing circuitry 138 can instruct the flash indicator to turn off in response to user input(s) to the verification request received via the remote control device 126 or the smart home device 128. In some examples, the user presence analyzing circuitry 138 instructs flash indicator 204 to operate to notify the user(s) 108, 110, 112, 120 that the image sensor(s) 142 are collecting image data.

Figure 3:
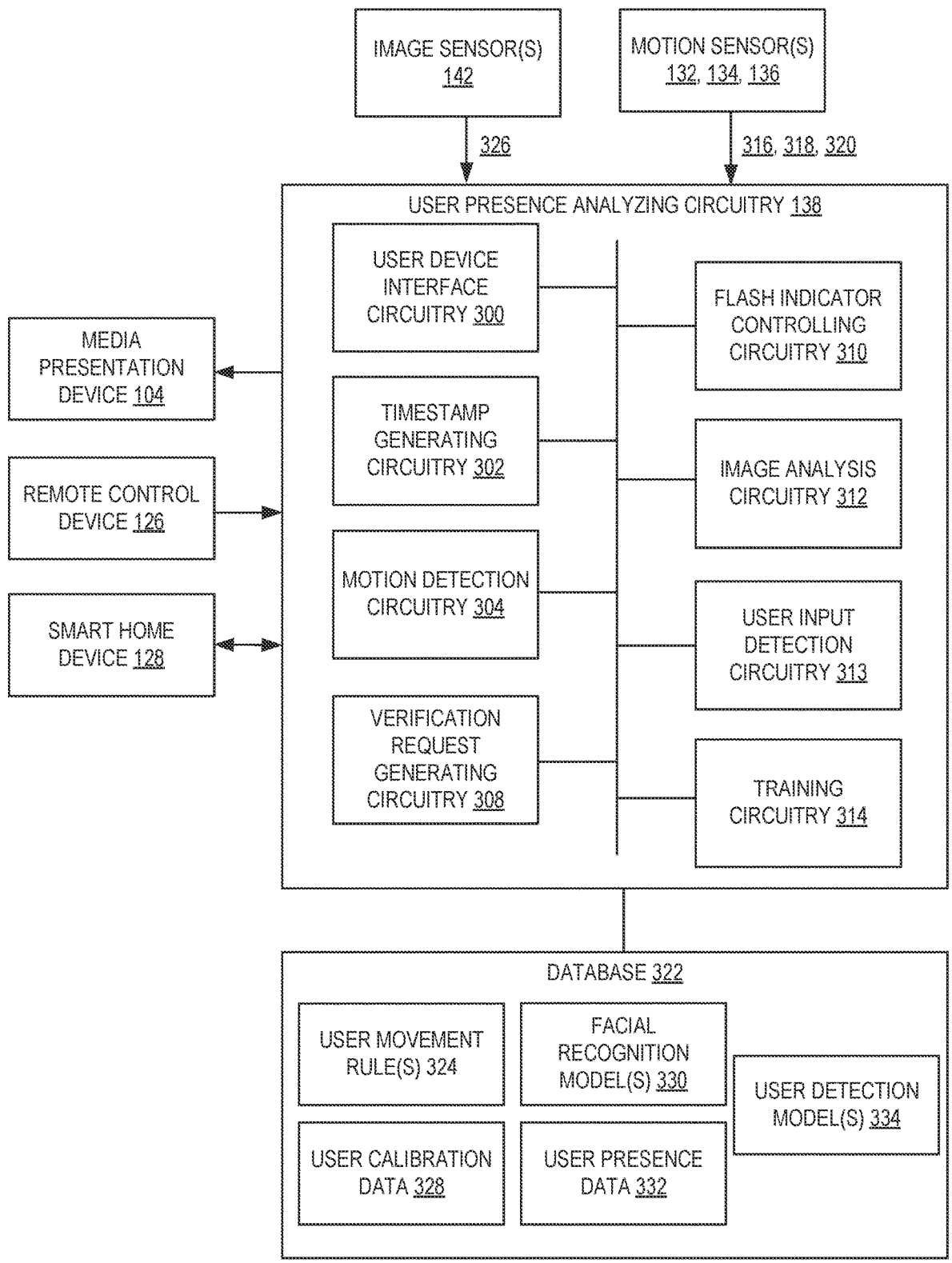
FIG. 3 is a block diagram of an example implementation of the user presence analyzing circuitry of FIG. 1.

FIG. 3 is a block diagram of an example implementation of the user presence analyzing circuitry 138 of FIGS. 1 and/or 2 to generate requests for audience presence verification based on detect changes in movement relative to the primary viewing area 106 of the house 102 of FIG. 1. The user presence analyzing circuitry 138 of FIG. 3 may be instantiated (e.g., creating an instance of, bring into being for any length of time, materialize, implement, etc.) by processor circuitry such as a central processing unit executing instructions. Additionally or alternatively, the user presence analyzing circuitry 138 of FIG. 3 may be instantiated (e.g., creating an instance of, bring into being for any length of time, materialize, implement, etc.) by an ASIC or an FPGA structured to perform operations corresponding to the instructions. It should be understood that some or all of the circuitry of FIG. 3 may, thus, be instantiated at the same or different times. Some or all of the circuitry may be instantiated, for example, in one or more threads executing concurrently on hardware and/or in series on hardware. Moreover, in some examples, some or all of the circuitry of FIG. 3 may be implemented by one or more virtual machines and/or containers executing on the microprocessor.

The example user presence analyzing circuitry 138 includes example user device interface circuitry 300, example timestamp generating circuitry 302, example motion detection circuitry 304, example verification request generating circuitry 308, example flash indicator controlling circuitry 310, example image analysis circuitry 312, example user input detection circuitry 313, and example training circuitry 314.

The user device interface circuitry 300 of the example user presence analyzing circuitry 138 of FIG. 3 facilitates establishment of respective communication channels with the media presentation device 104 and/or the smart home device 128. The user device interface circuitry 300 can cause wireless communicative coupling(s) with the media presentation device 104 and/or the smart home device 128 via, for instance, WiFi, Bluetooth®, etc. The user device interface circuitry 300 can cause the communicative coupling(s) to be established based on current or future wired or wireless communication protocols.

As illustrated in FIG. 3, the example user presence analyzing circuitry 138 receives signal(s) 316, 318, 320 output by the motion sensor(s) 132, 134, 136, respectively. The timestamp generating circuitry 302 of the example user presence analyzing circuitry 138 of FIG. 3 assigns timestamps to the motion sensor signal(s) 316, 318, 320. The timestamped motion signal(s) 316, 318, 320 can be stored a database 322 In some examples, the example user presence analyzing circuitry 138 includes the database 322. In some examples, the database 322 is located external to the user presence analyzing circuitry 138 as shown in FIG. 3.

The motion detection circuitry 304 of FIG. 3 analyzes motion sensor data corresponding to the timestamped signal(s) 316, 318, 320 to detect movement(s) of the user(s) 108, 110, 112, 120 relative to the primary viewing area 106 of the house 102. The motion detection circuitry 304 recognizes user movement(s) based on user movement rule(s) 324. The user movement rule(s) 324 can be stored in the database 322. The user movement rule(s) 324 can define changes in the signal(s) 316, 318, 320 output by the motion sensor(s) 132, 134, 136 and indicative of movement by the user(s) 108, 110, 112, 120 that warrant verification of the presence of the user(s) 108, 110, 112, 120 in the primary viewing area 106.

For example, based on the user movement rule(s) 324, the user presence analyzing circuitry 138 can recognize events or changes (e.g., differential changes) in the motion sensor signal(s) 316, 318, 320 that are indicative of changes in infrared energy detected by the sensor(s) 132, 134, 136 as, for instance, one of the users 108, 110, 112, 120 walks by the sensor(s) 132, 134, 136. The user movement rule(s) 324 can define threshold values for the event(s) in the signal(s) 316, 318, 320 to filter out, for instance, small changes in infrared energy detected by the sensor(s) 132, 134, 136 due to, for instance, a pet entering the primary viewing area 106, as compared to changes in infrared energy from a human user walking by the sensor(s) 132, 134, 136.

The user movement rule(s) 324 can define patterns based on the motion sensor signal data that warrant verification of user presence in the primary viewing area 106. For instance, the user movement rule(s) 324 can define that motion detected based on the signal(s) 318 output by the second sensor 134 located at the passageway 118 is indicative of movement by the user(s) 108, 110, 112, 120 relative to the primary viewing area 106 because of the location of the second sensor 134 at the passageway 118. The user movement rule(s) 324 can indicate that motion detected based on the signal(s) 316 output by the first sensor 132 in the primary viewing area 106 should be verified based on motion detected in the signal(s) 318, 320 output by the second sensor 134 and/or the third sensor 136 to confirm that one of the users 108, 110, 112, 120 has left or entered the primary viewing area 106.

In some examples, the user movement rule(s) 324 can define changes (e.g., differential changes) in infrared energy detected across multiple sub-sections of the field of view of the first motion sensor 132 (representing regions of the primary viewing area 106) should prompt a request for user presence verification. The changes across two or more sub-sections of the field of view of the first sensor 132 can indicate substantial user movement in the primary viewing area 106 that warrants verification of user presence. In some examples, the user movement rule(s) 324 indicate that if movement is detected in one of the sub-sections of the field of view of the first motion sensor 132 but not the other sub-sections, then user presence should not be verified because the movement does not indicate substantial movement relative to the primary viewing area 106.

In response to the detection of user movement(s) that satisfy the user movement rule(s) 324, the verification request generating circuitry 308 causes one or more of the metering device 122, the media presentation device 104, the smart home device 128, or the image sensor(s) 142 to output request(s), prompt(s), notice(s), or to otherwise obtain verification of the user(s) 108, 110, 112, 120 in the primary viewing area 106. In some examples, the verification request generating circuitry 308 instructs the media presentation device 104 to display message(s) to request user input(s) identifying the user(s) 108, 110, 112, 120 in the primary viewing area 106, whether the respective user(s) 108, 110, 112, 120 started or stopped watching media content, whether the respective user(s) 108, 110, 112, 120 left the primary viewing area 106 temporarily, etc., or whether there was no change with respect to the presence of the respective user(s) 108, 110, 112, 120 in the primary viewing area 106.

In some examples, the verification request generating circuitry 308 instructs the smart home device 128 to output request(s) for user input(s) identifying the user(s) 108, 110, 112, 120 in the primary viewing area 106. The request(s) can include audio request(s) output via speaker(s) of the smart home device 128 and/or visual request(s) presented via a display of the smart home device 128.

In some examples, in response to the detection of user movement by the motion detection circuitry 304, the verification request generating circuitry 308 instructs the image sensor(s) 142 to generate image data 326 of the primary viewing area 106. The verification request generating circuitry 308 can instruct the image sensor(s) 142 to generate the image data for a threshold period of time (e.g., 3 seconds, 5 seconds, etc., which may be predefined, configured based on user input, adaptive, etc.) based on user input(s). After the threshold period of time has passed, the verification request generating circuitry 308 instructs the image sensor(s) 142 to turn off or otherwise stop collecting of image data.

The flash indicator controlling circuitry 310 of the example user presence analyzing circuitry 138 of FIG. 3 controls operation of the flash indicator 204 (FIG. 2) of the metering device 122 based on the instructions generated by the verification request generating circuitry 308. For example, in response to the verification request generating circuitry 308 instructing the image sensor(s) 142 to generate image data, the flash indicator controlling circuitry 310 can instruct the flash indicator 204 to turn on to provide notice to individuals in the primary viewing area 106 that the image sensor(s) 142 are actively capturing images of the primary viewing area 106. In some examples, the verification request generating circuitry 308 can instruct the flash indicator 204 to operate to notify the user that a user verification request has been presented via the media presentation device 104 and/or the smart home device 128. In some examples, the verification request generating circuitry 308 communicates with the flash indicator controlling circuitry 310 to cause the flash indicator 204 to operate to notify the user(s) 108, 110, 112, 120 that the user identifier(s) of the user(s) 108, 110, 112, 120 in the primary viewing area 106 should be entered via the remote control device 126 without other notifications being presented (i.e., only the flashing indicator 204 serves as the request for user presence information).

The image analysis circuitry 312 of the example user presence analyzing circuitry 138 of FIG. 3 analyzes the image data 326 including the primary viewing area 106 generated by the images sensor(s) 142 to identify the user(s) 108, 110, 112, 120 in the image data 326. The image analysis circuitry 312 performs facial recognition analysis to recognize the user(s) 108, 110, 112, 120 in the image data 326 based on user calibration data 328 stored in the database 326. The user calibration data 328 can include images of the users 108, 110, 112, 120. The image analysis circuitry 312 can be trained to recognize the user(s) 108, 110, 112, 120 in the image data 326 based on the user calibration data 328 and facial recognition model(s) 330 stored in the database 322. In some examples, if the image analysis circuitry 312 is unable to recognize the individual(s) in the image data 326, the verification request generating circuitry 308 causes the verification request(s) to be output via the metering device 122, the media presentation device 104, and/or the smart home device 128.

The user input detection circuitry 313 of the example user presence analyzing circuitry 138 of FIG. 3 recognizes user input(s) in response to the user presence verification requests. In some examples, the user input(s) include the identifies of the user(s) 108, 110, 112, 120 recognized by the image analysis circuitry 312 based on the analysis of the image data 326. In some examples, the user input detection circuitry 313 interprets input(s) and/or selection(s) received via the remote control device 126 in response to the message(s) presented via the media presentation device 104 and/or the flash indicator 204 of the metering device 122. The user input(s) received via the remote control device 126 can be detected via, for instance, the wireless transceiver of the 206 of the metering device 122 and accessed by the user input detection circuitry 313.

In some examples, the user input(s) to the user presence verification request(s) are provided as speech input(s) detected by the microphone(s) of the smart home device 128. In some examples, the user input detection circuitry 313 receives the audio signal data including the speech input(s) from the smart home device 128 via the user device interface circuitry 300. In some such examples, the user input detection circuitry 313 can detect the user inputs based on speech detection analysis to identify, for instance, the user identifier(s). In some examples, the speech detection analysis can be performed by the smart home device 128 and the results of the speech analysis are accessed by the user input detection circuitry 313.

In some examples, the user input detection circuitry 313 correlates the user input(s) with the timestamped signal data. For example, in response to a user input indicating that the user 108, 110, 112, 120 left the primary viewing area 106 temporarily and returned, the user input detection circuitry 313 identifies the timestamped signal data 316, 316, 318 indicative of the user 108, 110, 112, 120 re-entering the primary viewing area 106 (e.g., a change in the signal(s) 316, 318, 320 closest in proximity to a time in which the user input was received). Such information can be used with the timestamped signal(s) 316, 318, 320 that prompted the verification request to estimate a duration of time for which the user 108, 110, 112, 120 left the primary viewing area 106 and, thus, whether or not the user 108, 110, 112, 120 was exposed to particular media (e.g., a commercial)

In some examples, the user input detection circuitry 313 correlates the user identification information (e.g., the panelist identifier(s)) with signatures and/or watermarks of the particular media content presented via the media presentation device 104 and captured by the metering device 122 to identify which user(s) 108, 110, 112, 120 were present during presentation of particular media content.

The user input detection circuitry 313 stores the user input(s) (e.g., the user(s) identified via image analysis, the input(s) received via the remote control device 126 and/or the smart home device 128) in the database 322 as user presence data 332. The user presence data 332 can include the timestamps associated with events of interest in the signal data 316, 318, 320 (e.g., timestamps for the events in signal(s) 316, 318, 320 that prompted the verification request, timestamps for the events indicative of the user 108, 110, 112, 120 leaving and re-entering the primary viewing area, etc.). The user presence data 332 can include the media signatures and/or watermarks (e.g., codes) corresponding to the timestamped movement events and/or the user identifier(s). The user presence data 332 can be accessible to third parties (e.g., broadcasters, advertising companies) via the network 140 to report, for instance, the user presence data in view of media content to determine the audience exposed to the media content.

In some examples, the flash indicator controlling circuitry 310 instructs the flash indicator 204 (FIG. 2) of the metering device 122 to turn off in response to an indication by the user input detection circuitry 313 that a response has been received.

The training circuitry 314 of the example user presence analyzing circuitry 138 of FIG. 3 uses the user presence data 332 to train one or more user detection models 334 (e.g., machine learning algorithms). In some examples, the user detection models 334 are executed by the training circuitry 314 to refine the user movement rule(s) 324 executed by the motion detection circuitry 304 to recognize change(s) or event(s) in the signal(s) 316, 318, 320 from the motion sensor(s) 132, 134, 136 that are indicative of movement of the user(s) 108, 110, 112, 120 relative to the primary viewing area 106. In particular, the user movement rule(s) 324 can be tuned by the training circuitry 314 based on the user input(s) in the user presence data 332 to improve accuracy in detecting movement(s) indicative of the user(s) 108, 110, 112, 120 entering or leaving the primary viewing area 106, which can affect exposure of the user(s) 108, 110, 112, 120 to the media content.

In some examples, the training circuitry 314 executes the user detection model(s) 334 based on the user presence data 332 and signal data corresponding to previous signal(s) 316, 318, 320 received from the motion sensor(s) 132, 136, 134 and stored in the database 322 to adjust the sensitivity of the sensor(s) 132, 134, 136 with respect to detecting changes in infrared energy. For example, the training circuitry 314 can use the user presence data 332 to confirm whether the previous signal(s) 316, 318, 320 accurately detected user movements. The training circuitry 314 can generate instructions to calibrate the sensor(s) 132, 134, 136 based on the whether or not the changes infrared energy captured by the sensor(s) 132, 134, 136 represented user movements. The calibration of the sensitivity level(s) of the sensor(s) 132, 134, 136 can reduce instances false positives, such as a pet entering the primary viewing area 106, movements of one of the user(s) 108, 110, 112, 120 on a couch in the primary viewing area 106, etc.

In some examples, the user presence analyzing circuitry 138 includes means for interfacing with a user device. For example, the means for interfacing may be implemented by the user device interface circuitry 300. In some examples, the user device interface circuitry 300 may be instantiated by processor circuitry such as the example processor circuitry 812 of FIG. 8. For instance, the user device interface circuitry 300 may be instantiated by the example general purpose processor circuitry 900 of FIG. 9 executing machine executable instructions such as that implemented by at least blocks 402, 422, 424 of FIG. 4; block 500 of FIG. 5; and block 600 of FIG. 6. In some examples, the user device interface circuitry 300 may be instantiated by hardware logic circuitry, which may be implemented by an ASIC or the FPGA circuitry 1000 of FIG. 10 structured to perform operations corresponding to the machine readable instructions. Additionally or alternatively, the user device interface circuitry 300 may be instantiated by any other combination of hardware, software, and/or firmware. For example, the user device interface circuitry 300 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the user presence analyzing circuitry 138 includes means for generating timestamps. For example, the means for timestamp generating may be implemented by the timestamp generating circuitry 302. In some examples, the timestamp generating circuitry 302 may be instantiated by processor circuitry such as the example processor circuitry 812 of FIG. 8. For instance, the timestamp generating circuitry 302 may be instantiated by the example general purpose processor circuitry 900 of FIG. 9 executing machine executable instructions such as that implemented by at least block 404 of FIG. 4. In some examples, the timestamp generating circuitry 302 may be instantiated by hardware logic circuitry, which may be implemented by an ASIC or the FPGA circuitry 1000 of FIG. 10 structured to perform operations corresponding to the machine readable instructions. Additionally or alternatively, the timestamp generating circuitry 302 may be instantiated by any other combination of hardware, software, and/or firmware. For example, the timestamp generating circuitry 302 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the user presence analyzing circuitry 138 includes means for detecting motion. For example, the means for detecting motion may be implemented by the motion detection circuitry 304. In some examples, the motion detection circuitry 304 may be instantiated by processor circuitry such as the example processor circuitry 812 of FIG. 8. For instance, the motion detection circuitry 304 may be instantiated by the example general purpose processor circuitry 900 of FIG. 9 executing machine executable instructions such as that implemented by at least blocks 406, 408 of FIG. 4. In some examples, the motion detection circuitry 304 may be instantiated by hardware logic circuitry, which may be implemented by an ASIC or the FPGA circuitry 1000 of FIG. 10 structured to perform operations corresponding to the machine readable instructions. Additionally or alternatively, the motion detection circuitry 304 may be instantiated by any other combination of hardware, software, and/or firmware. For example, the motion detection circuitry 304 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the user presence analyzing circuitry 138 includes means for generating verification requests. For example, the means for generating verification requests may be implemented by the verification request generating circuitry 308. In some examples, the verification request generating circuitry 308 may be instantiated by processor circuitry such as the example processor circuitry 812 of FIG. 8. For instance, the verification request generating circuitry 308 may be instantiated by the example general purpose processor circuitry 900 of FIG. 9 executing machine executable instructions such as that implemented by at least block 410 of FIG. 4, block 502 of FIG. 5, block 602 of FIG. 6, and blocks 700, 706 of FIG. 7. In some examples, the verification request generating circuitry 308 may be instantiated by hardware logic circuitry, which may be implemented by an ASIC or the FPGA circuitry 1000 of FIG. 10 structured to perform operations corresponding to the machine readable instructions. Additionally or alternatively, the verification request generating circuitry 308 may be instantiated by any other combination of hardware, software, and/or firmware. For example, the verification request generating circuitry 308 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the user presence analyzing circuitry 138 includes means for controlling a flash indicator. For example, the means for controlling the flash indicator may be implemented by the flash indicator controlling circuitry 310. In some examples, the flash indicator controlling circuitry 310 may be instantiated by processor circuitry such as the example processor circuitry 812 of FIG. 8. For instance, the flash indicator controlling circuitry 310 may be instantiated by the example general purpose processor circuitry 900 of FIG. 9 executing machine executable instructions such as that implemented by at least blocks 504, 508 of FIG. 5; blocks 604, 608 of FIG. 6; and blocks 702, 708 of FIG. 7. In some examples, the flash indicator controlling circuitry 310 may be instantiated by hardware logic circuitry, which may be implemented by an ASIC or the FPGA circuitry 1000 of FIG. 10 structured to perform operations corresponding to the machine readable instructions. Additionally or alternatively, the flash indicator controlling circuitry 310 may be instantiated by any other combination of hardware, software, and/or firmware. For example, the flash indicator controlling circuitry 310 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the user presence analyzing circuitry 138 includes means for analyzing image data. For example, the means for image analysis may be implemented by the image analysis circuitry 312. In some examples, the image analysis circuitry 312 may be instantiated by processor circuitry such as the example processor circuitry 812 of FIG. 8. For instance, the image analysis circuitry 312 may be instantiated by the example general purpose processor circuitry 900 of FIG. 9 executing machine executable instructions such as that implemented by at least block 710 of FIG. 7. In some examples, the image analysis circuitry 312 may be instantiated by hardware logic circuitry, which may be implemented by an ASIC or the FPGA circuitry 1000 of FIG. 10 structured to perform operations corresponding to the machine readable instructions. Additionally or alternatively, the image analysis circuitry 312 may be instantiated by any other combination of hardware, software, and/or firmware. For example, the image analysis circuitry 312 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the user presence analyzing circuitry 138 includes means for detecting user input(s). For example, the means for detecting user input(s) may be implemented by the user input detection circuitry 313. In some examples, the user input detection circuitry 313 may be instantiated by processor circuitry such as the example processor circuitry 812 of FIG. 8. For instance, the user input detection circuitry 313 may be instantiated by the example general purpose processor circuitry 900 of FIG. 9 executing machine executable instructions such as that implemented by at least blocks 412, 414 of FIG. 4; block 506, 510 of FIG. 5; blocks 606, 610 of FIG. 6; and block 704 of FIG. 7. In some examples, the user input detection circuitry 313 may be instantiated by hardware logic circuitry, which may be implemented by an ASIC or the FPGA circuitry 1000 of FIG. 10 structured to perform operations corresponding to the machine readable instructions. Additionally or alternatively, the user input detection circuitry 313 may be instantiated by any other combination of hardware, software, and/or firmware. For example, the user input detection circuitry 313 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the user presence analyzing circuitry 138 includes means for training. For example, the means for training may be implemented by the training circuitry 314. In some examples, the training circuitry 314 may be instantiated by processor circuitry such as the example processor circuitry 812 of FIG. 8. For instance, the training circuitry 314 may be instantiated by the example general purpose processor circuitry 900 of FIG. 9 executing machine executable instructions such as that implemented by at least blocks 416, 418, and 420 of FIG. 4. In some examples, the training circuitry 314 may be instantiated by hardware logic circuitry, which may be implemented by an ASIC or the FPGA circuitry 1000 of FIG. 10 structured to perform operations corresponding to the machine readable instructions. Additionally or alternatively, the training circuitry 314 may be instantiated by any other combination of hardware, software, and/or firmware. For example, the training circuitry 314 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

While an example manner of implementing the user presence analyzing circuitry 138 of FIGS. 1 and/or 2 is illustrated in FIG. 3, one or more of the elements, processes, and/or devices illustrated in FIG. 3 may be combined, divided, re-arranged, omitted, eliminated, and/or implemented in any other way. Further, the example user device interface circuitry 300, the example timestamp generating circuitry 302, the example motion detection circuitry 304, the example verification request generating circuitry 308, the example flash indicator controlling circuitry 310, the example image analysis circuitry 312, the example user input detection circuitry 313, the example training circuitry 314, and/or, more generally, the example user presence analyzing circuitry 138 of FIGS. 1 and/or 2, may be implemented by hardware alone or by hardware in combination with software and/or firmware. Thus, for example, any of the example user device interface circuitry 300, the example timestamp generating circuitry 302, the example motion detection circuitry 304, the example verification request generating circuitry 308, the example flash indicator controlling circuitry 310, the example image analysis circuitry 312, the example user input detection circuitry 313, the example training circuitry 314, and/or, more generally, the example user presence analyzing circuitry 138, could be implemented by processor circuitry, analog circuit(s), digital circuit(s), logic circuit(s), programmable processor(s), programmable microcontroller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)) such as Field Programmable Gate Arrays (FPGAs). Further still, the example user presence analyzing circuitry 138 of FIGS. 1 and/or 2 may include one or more elements, processes, and/or devices in addition to, or instead of, those illustrated in FIG. 3, and/or may include more than one of any or all of the illustrated elements, processes, and devices.

Flowcharts representative of example hardware logic circuitry, machine readable instructions, hardware implemented state machines, and/or any combination thereof for implementing the user presence analyzing circuitry 138 of FIGS. 1, 2 and/or 3 is shown in FIGS. 4-7. The machine readable instructions may be one or more executable programs or portion(s) of an executable program for execution by processor circuitry, such as the processor circuitry 812 shown in the example processor platform 800 discussed below in connection with FIG. 8 and/or the example processor circuitry discussed below in connection with FIGS. 9 and/or 10. The program may be embodied in software stored on one or more non-transitory computer readable storage media such as a compact disk (CD), a floppy disk, a hard disk drive (HDD), a solid-state drive (SSD), a digital versatile disk (DVD), a Blu-ray disk, a volatile memory (e.g., Random Access Memory (RAM) of any type, etc.), or a non-volatile memory (e.g., electrically erasable programmable read-only memory (EEPROM), FLASH memory, an HDD, an SSD, etc.) associated with processor circuitry located in one or more hardware devices, but the entire program and/or parts thereof could alternatively be executed by one or more hardware devices other than the processor circuitry and/or embodied in firmware or dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a user) or an intermediate client hardware device (e.g., a radio access network (RAN)) gateway that may facilitate communication between a server and an endpoint client hardware device). Similarly, the non-transitory computer readable storage media may include one or more mediums located in one or more hardware devices. Further, although the example program is described with reference to the flowcharts illustrated in FIGS. 4-7, many other methods of implementing the example user presence interface circuitry 138 may alternatively be used. For example, the order of execution of the blocks may be changed, and/or some of the blocks described may be changed, eliminated, or combined. Additionally or alternatively, any or all of the blocks may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more hardware devices (e.g., a single-core processor (e.g., a single core central processor unit (CPU)), a multi-core processor (e.g., a multi-core CPU), etc.) in a single machine, multiple processors distributed across multiple servers of a server rack, multiple processors distributed across one or more server racks, a CPU and/or a FPGA located in the same package (e.g., the same integrated circuit (IC) package or in two or more separate housings, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., as portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of machine executable instructions that implement one or more operations that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc., in order to execute the machine readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example operations of FIGS. 4-7 may be implemented using executable instructions (e.g., computer and/or machine readable instructions) stored on one or more non-transitory computer and/or machine readable media such as optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms non-transitory computer readable medium and non-transitory computer readable storage medium are expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a," "an," "first," "second," etc.) do not exclude a plurality. The term "a" or "an" object, as used herein, refers to one or more of that object. The terms "a" (or "an"), "one or more," and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

Figure 4:
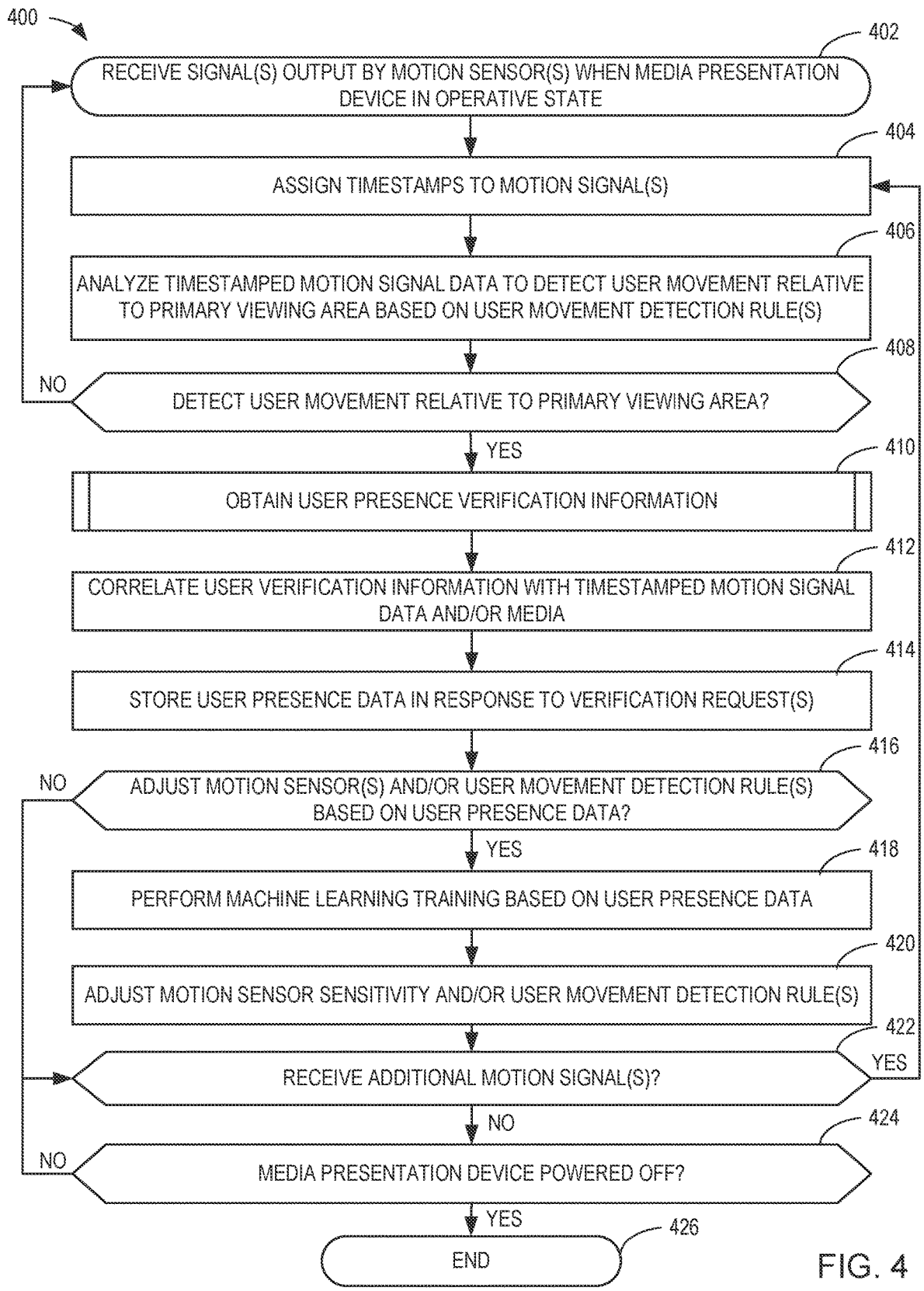
FIGS. 4-7 are flowcharts representative of example machine readable instructions and/or example operations that may be executed by example processor circuitry to implement the user presence analyzing circuitry of FIG. 3.

FIG. 4 is a flowchart representative of example machine readable instructions and/or example operations 400 that may be executed and/or instantiated by processor circuitry to detect (e.g., predict, identify) changes in user presence relative to the primary viewing area 106 of the house 102 of FIG. 1 and, thus, audience exposure to media content presented via the media presentation device 104 in the primary viewing area 106. The machine readable instructions and/or the operations 400 of FIG. 4 begin at block 402, at which the timestamp generating circuitry 302 receives signal(s) output by the motions sensor(s) 132, 134, 136 when the media presentation device 104 is in an operative state (i.e., displaying media content). At block 404, the timestamp generating circuitry 302 assigns timestamps to the signal(s) from the motion sensor(s) 132, 134, 136.

At block 406, the motion detection circuitry 304 analyzes the motion sensor signal data corresponding to the time-stamped signal(s) 316, 318, 320 to detect movement(s) by the user(s) 108, 110, 112, 120 relative to the primary viewing area 106 based on the user movement rule(s) 324. The user movement rule(s) 324 can define threshold(s) of changes in the signal data (e.g., indicative of changes in infrared energy); patterns with respect to movement detected by two of more of the sensor(s) 132, 134, 136; and/or patterns of movement across a field of view of a respective sensor 132, 134, 136. In the example of FIG. 4, detection of movement relative to the primary viewing area 106 is indicative of changes in user presence relative to the primary viewing area 106 and, thus, exposure to media content presented via the media presentation device 104.

If, at block 408, the motion detection circuitry 304 detects user movement relative to the primary viewing area 106, then, at block 410, the verification request generating circuitry 308 causes one or more of the media presentation device 104, the smart home device 128, and/or the image sensor(s) 142 to obtain user presence information to verify the user(s) 108, 110, 112, 120 in the primary viewing area 106 at a given time. As disclosed in connections with FIGS. 5-7, the verification request generating circuitry 308 can cause one or more devices (e.g., the media presentation device 104, the smart home device 128, the image sensor(s) 142) to output the requests.

At block 412, the user input detection circuitry 313 correlates the user inputs with the timestamped motion signal data that prompted the user presence verification requests and/or the media (e.g., signature(s) and/or watermark(s) (e.g., code(s)) collected by the metering device 122). For example, if the user input indicates the user 108, 110, 112, 120 left the primary viewing area 106 temporarily, the user input detection circuitry 313 can identify times when the user 108, 110, 112, 120 left and returned to the primary viewing area 106 based on the timestamped signal data. The user input detection circuitry 313 can identify the media presented during the time when the user 108, 110, 112, 120 left the primary viewing area based on the signature(s) and/or watermarks collected by the metering device 122.

At block 414, the user input detection circuitry 313 stores the user presence data 332 (e.g., the user inputs, the corresponding timestamps and/or media signature(s) and/or watermark(s)) in the database 322 for access by third parties (e.g., advertising companies).

At block 416, the training circuitry 314 determines if the user presence data 332 should be used to calibrate or adjust the sensitivity of the motion sensor(s) 132, 134, 136 with respect to detecting changes in infrared energy to reduce false positives with respect to identifying user movement. In some examples, at block 416, the training circuitry 314 determines if the user movement rule(s) 324 used by the motion detection circuitry 304 should be adjusted to reduce false positives with respect to identifying user movement. At block 418, the training circuitry 314 executes the user detection model(s) 334 using the user presence data 332 to refine the user movement rule(s) 324 for use by the motion detection circuitry 304 in recognizing use movement and/or to determine optimal sensitivity levels for the motion sensor(s) 132, 134, 136 to detect user movement as compared to, for instance, movement by pets. At block 420, the user device interface circuitry 300 can transmit instructions to cause the sensitivity of the motion sensor(s) 132, 134, 136 to be adjusted. In some examples, at block 420, the updated user movement rule(s) 324 are stored in the database 322 for use by the motion detection circuitry 304 when analyzing subsequent motion signal data.

The example instructions 400 end when no further motion signal(s) are received from the motion sensor(s) 132, 134, 136 and the media presentation device 104 is powered off (blocks 422, 424, 426).

Figure 5:
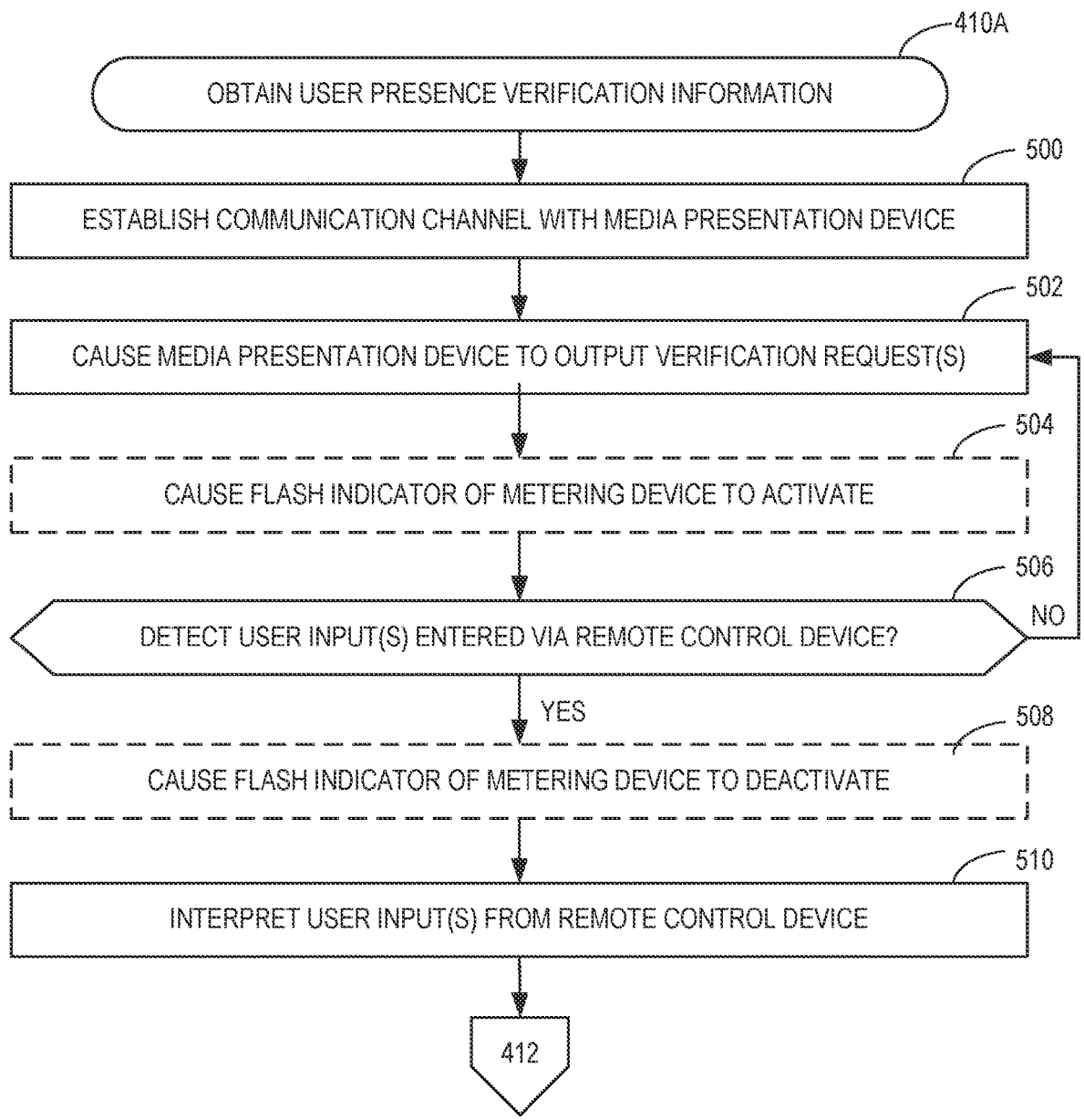

FIG. 5 is a first flowchart representative of example machine-readable instructions and/or example operations 410A that may be executed and/or instantiated by processor circuitry to implement block 410 of FIG. 4 to obtain user presence verification information in response to detection of user movement relative to the primary viewing area 106. At block 500, the user device interface circuitry 300 establishes a communication channel with the media presentation device 104 via wireless or wired connections.

At block 502, the verification request generating circuitry 308 causes the media presentation device 104 to output (e.g., display) request(s) for the user(s) 108, 110, 112, 120 to indicate which user(s) 108, 110, 112, 120 are present in the primary viewing area 106. In some examples, the message(s) can request confirmation whether the respective user(s) 108, 110, 112, 120 left the primary viewing area 106 temporarily, whether there was no change in user presence, etc.

In some examples of FIG. 5, the flash indicator controlling circuitry 310 causes the flash indicator 204 of the metering device 122 to activate at block 504. The activation of the flash indicator 204 can alert the user(s) 108, 110, 112, 120 that a request for verification of user presence is pending.

At block 504, the user input detection circuitry 313 determines if user input(s) in response to the message(s) presented via the media presentation device 104 have been received via the remote control device 126. The user input(s) can be detected via, for instance, the wireless transceiver of the 206 of the metering device 122 and accessed by the user input detection circuitry 313. If the user input detection circuitry 313 does not detect the input(s), the verification request generating circuitry 308 continues to cause the media presentation device 104 to display the user presence verification request(s).

At block 508, the flash indicator controlling circuitry 310 causes the flash indicator 204 of the metering device 122 to deactivate in response to detection of the user input(s).

At block 510, the user input detection circuitry 313 interprets the user input(s) entered via the remote control device 126 to identify the user(s) 108, 110, 112, 120 present in the primary viewing area 106. Control proceeds to block 412 of FIG. 4.

Although the example of FIG. 5 is discussed in connection presentation of the user verification request(s) via the media presentation device 104, in some examples, the display of the request(s) via the media presentation device 104 is optional and, instead, the flash indicator of the metering device 122 serves as the primary alert that the user(s) 108, 110, 112, 120 should provide the user identifier(s) for the user(s) 108, 110, 112, 120 present in the primary viewing area 106 via the remote control device 126.

Figure 6:
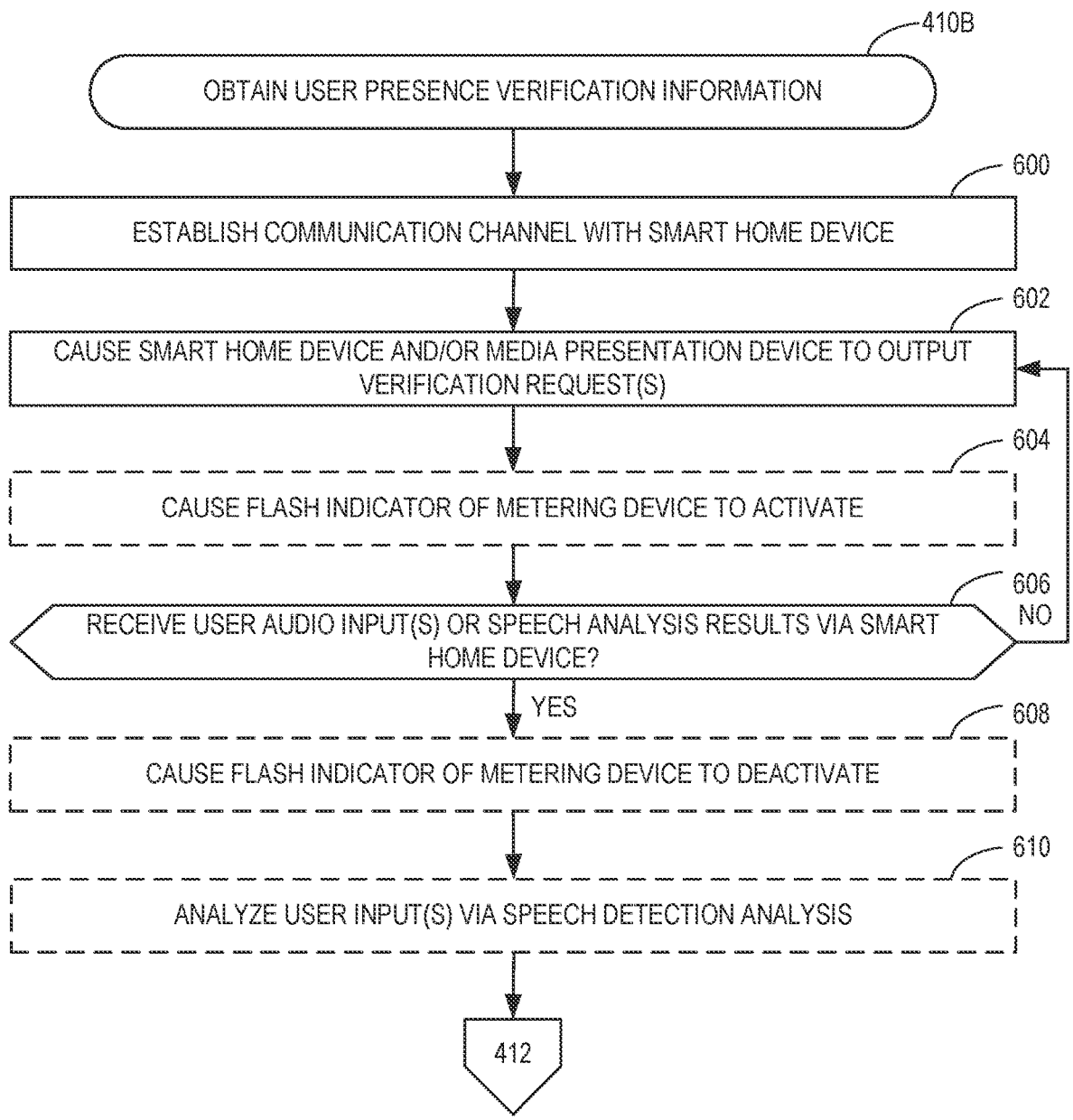

FIG. 6 is a second flowchart representative of example machine-readable instructions and/or example operations 410B that may be executed and/or instantiated by processor circuitry to implement block 410 of FIG. 4 to obtain user presence verification information in response to detection of user movement relative to the primary viewing area 106. At block 600, the user device interface circuitry 300 establishes a communication channel with the smart home device 128 via wireless or wired connections.

At block 602, the verification request generating circuitry 308 causes the media presentation device 104 and/or the smart home device 128 to output request(s) for the user(s) 108, 110, 112, 120 to indicate which user(s) 108, 110, 112, 120 are present in the primary viewing area 106. In some examples, the media presentation device 104 displays the request(s) as disclosed in connection with FIG. 5. In some examples, the verification request generating circuitry 308 causes the smart home device 128 to output an audio message via the speaker(s) of the smart home device 128 requesting that the user(s) 108, 110, 112, 120 indicate which users(s) 108, 110, 112, 120 are in the primary viewing area 106.

In some examples of FIG. 6, the flash indicator controlling circuitry 310 causes the flash indicator 204 of the metering device 122 to activate at block 604 to alert the user(s) 108, 110, 112, 120 that a request for verification of user presence is pending.

At block 606, the user input detection circuitry 313 determines whether user audio input(s) and/or speech analysis results of the audio input(s) have been received from the smart home device 128 (e.g., via the user device interface circuitry 300). If the user input detection circuitry 313 determines that the user audio input(s) have not yet been received via the smart home device 128, the verification request generating circuitry 308 continues to cause the media presentation device 104 and/or the smart home device 128 to output the user presence verification request(s) (e.g., cause the smart home device 128 to repeat the audio message).

At block 608, the flash indicator controlling circuitry 310 causes the flash indicator 204 of the metering device 122 to deactivate in response to detection of the user input(s).

In examples in which the user input detection circuitry 313 receives the audio input(s) from the smart home device 128, the user input detection circuitry 313 performs speech detection analysis to recognize the input(s) in the audio data at block 610. For instance, the user input detection circuitry 313 can perform speech analysis to detect the user identifier(s) in the speech input(s). Control proceeds to block 412 of FIG. 4.

Figure 7:
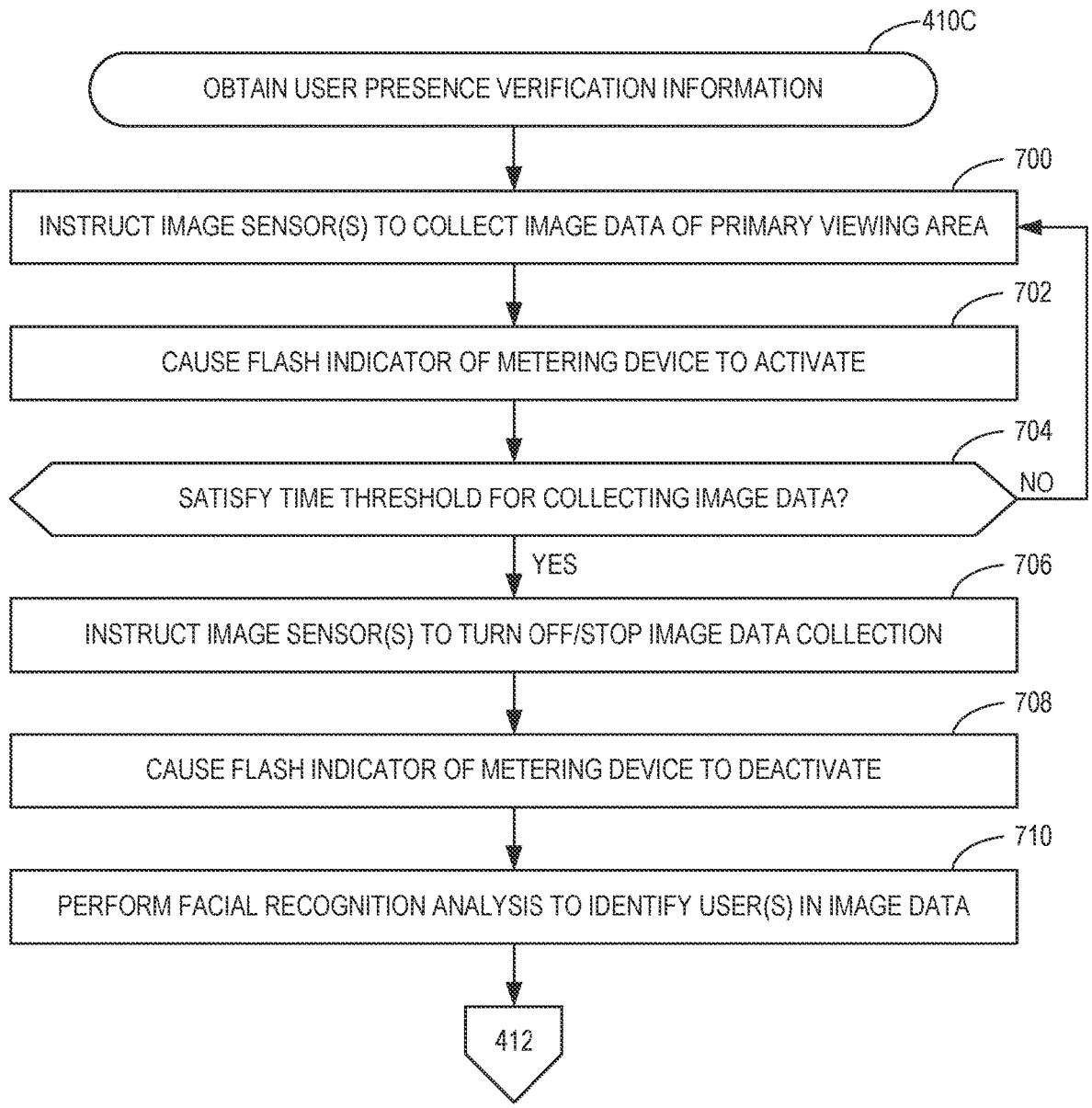

FIG. 7 is a third flowchart representative of example machine-readable instructions and/or example operations 410C that may be executed and/or instantiated by processor circuitry to implement block 410 of FIG. 4 to obtain user presence verification information in response to detection of user movement relative to the primary viewing area 106. At block 700, the verification request generating circuitry 308 instructs the image sensor(s) 142 to collect image data including the primary viewing area 106. At block 702, the flash indicator controlling circuitry 310 causes the flash indicator 204 of the metering device 122 to activate to alert the user(s) 108, 110, 112, 120 that the image sensor(s) 142 are generating image data.

At block 704, the verification request generating circuitry 308 determines if a time threshold for generating the image data has been satisfied. When the time threshold for generating image data has been satisfied, the verification request generating circuitry 308 instructs the image sensor(s) 142 to turn off or otherwise stop collecting image data at block 706.

At block 708, the flash indicator controlling circuitry 310 causes the flash indicator 204 of the metering device 122 to deactivate in response to completion of the image data collection.

At block 710, the image analysis circuitry 312 performs facial recognition analysis to identify the user(s) 108, 110, 112, 120 in the image data (and, thus, the user(s) 108, 110, 112, 120 in the primary viewing are 106). Control proceeds to block 412 of FIG. 4.

Figure 8:
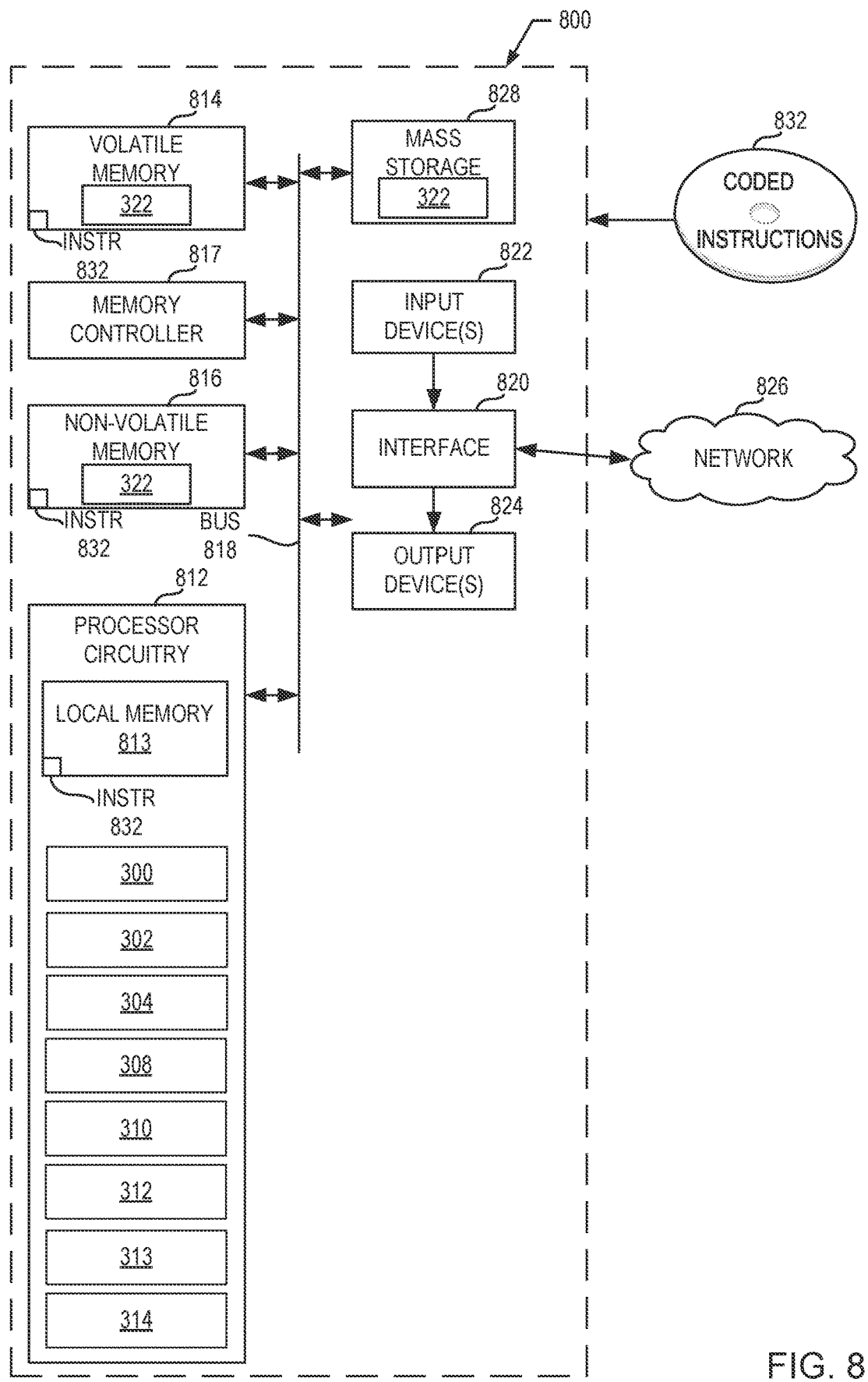
FIG. 8 is a block diagram of an example processing platform including processor circuitry structured to execute the example machine readable instructions and/or the example operations of FIGS. 4, 5, 6, and/or 7 to implement the user presence analyzing circuitry of FIG. 3.

FIG. 8 is a block diagram of an example processor platform 800 structured to execute and/or instantiate the machine readable instructions and/or the operations of FIGS. 4, 5, 6, and/or 7 to implement the user presence analyzing circuitry 138 of FIG. 3. The processor platform 800 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, or any other type of computing device.

The processor platform 800 of the illustrated example includes processor circuitry 812. The processor circuitry 812 of the illustrated example is hardware. For example, the processor circuitry 812 can be implemented by one or more integrated circuits, logic circuits, FPGAs, microprocessors, CPUs, GPUs, DSPs, and/or microcontrollers from any desired family or manufacturer. The processor circuitry 812 may be implemented by one or more semiconductor based (e.g., silicon based) devices. In this example, the processor circuitry 812 implements the example user device interface circuitry 300, the example timestamp generating circuitry 302, the example motion detection circuitry 304, the example verification request generating circuitry 308, the example flash indicator controlling circuitry 310, the example image analysis circuitry 312, the example user input detection circuitry 313, and the example training circuitry 314.

The processor circuitry 812 of the illustrated example includes a local memory 813 (e.g., a cache, registers, etc.). The processor circuitry 812 of the illustrated example is in communication with a main memory including a volatile memory 814 and a non-volatile memory 816 by a bus 818. The volatile memory 814 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 816 may be implemented by flash memory and/or any other desired type of memory device. Access to the main memory 814, 816 of the illustrated example is controlled by a memory controller 817.

The processor platform 800 of the illustrated example also includes interface circuitry 820. The interface circuitry 820 may be implemented by hardware in accordance with any type of interface standard, such as an Ethernet interface, a universal serial bus (USB) interface, a Bluetooth® interface, a near field communication (NFC) interface, a Peripheral Component Interconnect (PCI) interface, and/or a Peripheral Component Interconnect Express (PCIe) interface.

In the illustrated example, one or more input devices 822 are connected to the interface circuitry 820. The input device(s) 822 permit(s) a user to enter data and/or commands into the processor circuitry 812. The input device(s) 822 can be implemented by, for example, an audio sensor, a microphone, a camera (still or video), a keyboard, a button, a mouse, a touchscreen, a track-pad, a trackball, an isopoint device, and/or a voice recognition system.

One or more output devices 824 are also connected to the interface circuitry 820 of the illustrated example. The output device(s) 824 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 820 of the illustrated example, thus, typically includes a graphics driver card, a graphics driver chip, and/or graphics processor circuitry such as a GPU.

The interface circuitry 820 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 826. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 800 of the illustrated example also includes one or more mass storage devices 828 to store software and/or data. Examples of such mass storage devices 828 include magnetic storage devices, optical storage devices, floppy disk drives, HDDs, CDs, Blu-ray disk drives, redundant array of independent disks (RAID) systems, solid state storage devices such as flash memory devices and/or SSDs, and DVD drives.

The machine executable instructions 832, which may be implemented by the machine readable instructions of FIGS. 4, 5, 6, and/or 7, may be stored in the mass storage device 828, in the volatile memory 814, in the non-volatile memory 816, and/or on a removable non-transitory computer readable storage medium such as a CD or DVD.

Figure 9:
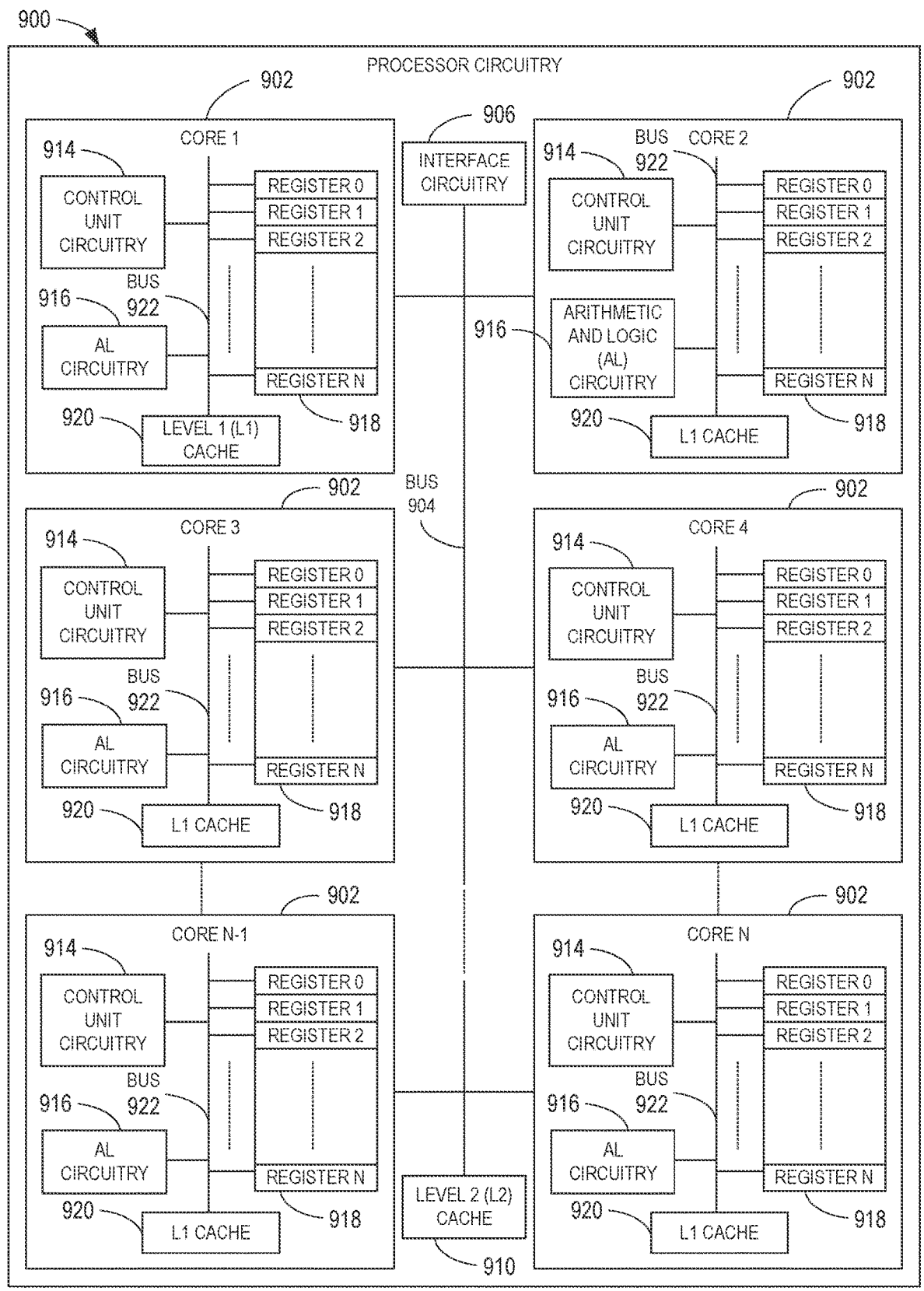
FIG. 9 is a block diagram of an example implementation of the processor circuitry of FIG. 8.

FIG. 9 is a block diagram of an example implementation of the processor circuitry 812 of FIG. 8. In this example, the processor circuitry 812 of FIG. 8 is implemented by a general purpose microprocessor 900. The general purpose microprocessor circuitry 900 executes some or all of the machine readable instructions of the flowcharts of FIGS. 4, 5, 6, and/or 7 to effectively instantiate the circuitry of FIG. 3 as logic circuits to perform the operations corresponding to those machine readable instructions. In some such examples, the circuitry of FIG. 3 is instantiated by the hardware circuits of the microprocessor 900 in combination with the instructions. For example, the microprocessor 900 may implement multi-core hardware circuitry such as a CPU, a DSP, a GPU, an XPU, etc. Although it may include any number of example cores 902 (e.g., 1 core), the microprocessor 900 of this example is a multi-core semiconductor device including N cores. The cores 902 of the microprocessor 900 may operate independently or may cooperate to execute machine readable instructions. For example, machine code corresponding to a firmware program, an embedded software program, or a software program may be executed by one of the cores 902 or may be executed by multiple ones of the cores 902 at the same or different times. In some examples, the machine code corresponding to the firmware program, the embedded software program, or the software program is split into threads and executed in parallel by two or more of the cores 902. The software program may correspond to a portion or all of the machine readable instructions and/or operations represented by the flowcharts of FIGS. 4, 5, 6, and/or 7.

The cores 902 may communicate by a first example bus 904. In some examples, the first bus 904 may implement a communication bus to effectuate communication associated with one(s) of the cores 902. For example, the first bus 904 may implement at least one of an Inter-Integrated Circuit (I2C) bus, a Serial Peripheral Interface (SPI) bus, a PCI bus, or a PCIe bus. Additionally or alternatively, the first bus 904 may implement any other type of computing or electrical bus. The cores 902 may obtain data, instructions, and/or signals from one or more external devices by example interface circuitry 906. The cores 902 may output data, instructions, and/or signals to the one or more external devices by the interface circuitry 906.

Although the cores 902 of this example include example local memory 920 (e.g., Level 1 (L1) cache that may be split into an L1 data cache and an L1instruction cache), the microprocessor 900 also includes example shared memory 910 that may be shared by the cores (e.g., Level 2 (L2_cache)) for high-speed access to data and/or instructions. Data and/or instructions may be transferred (e.g., shared) by writing to and/or reading from the shared memory 910. The local memory 920 of each of the cores 902 and the shared memory 910 may be part of a hierarchy of storage devices including multiple levels of cache memory and the main memory (e.g., the main memory 814, 816 of FIG. 8). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 902 may be referred to as a CPU, DSP, GPU, etc., or any other type of hardware circuitry. Each core 902 includes control unit circuitry 914, arithmetic and logic (AL) circuitry (sometimes referred to as an ALU) 916, a plurality of registers 918, the L1 cache 920, and a second example bus 922. Other structures may be present. For example, each core 902 may include vector unit circuitry, single instruction multiple data (SIMD) unit circuitry, load/store unit (LSU) circuitry, branch/jump unit circuitry, floating-point unit (FPU) circuitry, etc. The control unit circuitry 914 includes semiconductor-based circuits structured to control (e.g., coordinate) data movement within the corresponding core 902. The AL circuitry 916 includes semiconductor-based circuits structured to perform one or more mathematic and/or logic operations on the data within the corresponding core 902. The AL circuitry 916 of some examples performs integer based operations. In other examples, the AL circuitry 916 also performs floating point operations. In yet other examples, the AL circuitry 916 may include first AL circuitry that performs integer based operations and second AL circuitry that performs floating point operations. In some examples, the AL circuitry 916 may be referred to as an Arithmetic Logic Unit (ALU). The registers 918 are semiconductor-based structures to store data and/or instructions such as results of one or more of the operations performed by the AL circuitry 916 of the corresponding core 902. For example, the registers 918 may include vector register(s), SIMD register(s), general purpose register(s), flag register(s), segment register(s), machine specific register(s), instruction pointer register(s), control register(s), debug register(s), memory management register(s), machine check register(s), etc. The registers 918 may be arranged in a bank as shown in FIG. 9. Alternatively, the registers 918 may be organized in any other arrangement, format, or structure including distributed throughout the core_02 to shorten access time. The second bus 922 may implement at least one of an I2C bus, a SPI bus, a PCI bus, or a PCIe bus Each core 902 and/or, more generally, the microprocessor 900 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 900 is a semiconductor device fabricated to include many transistors interconnected to implement the structures described above in one or more integrated circuits (ICs) contained in one or more packages. The processor circuitry may include and/or cooperate with one or more accelerators. In some examples, accelerators are implemented by logic circuitry to perform certain tasks more quickly and/or efficiently than can be done by a general purpose processor. Examples of accelerators include ASICs and FPGAs such as those discussed herein. A GPU or other programmable device can also be an accelerator. Accelerators may be on-board the processor circuitry, in the same chip package as the processor circuitry and/or in one or more separate packages from the processor circuitry.

Figure 10:
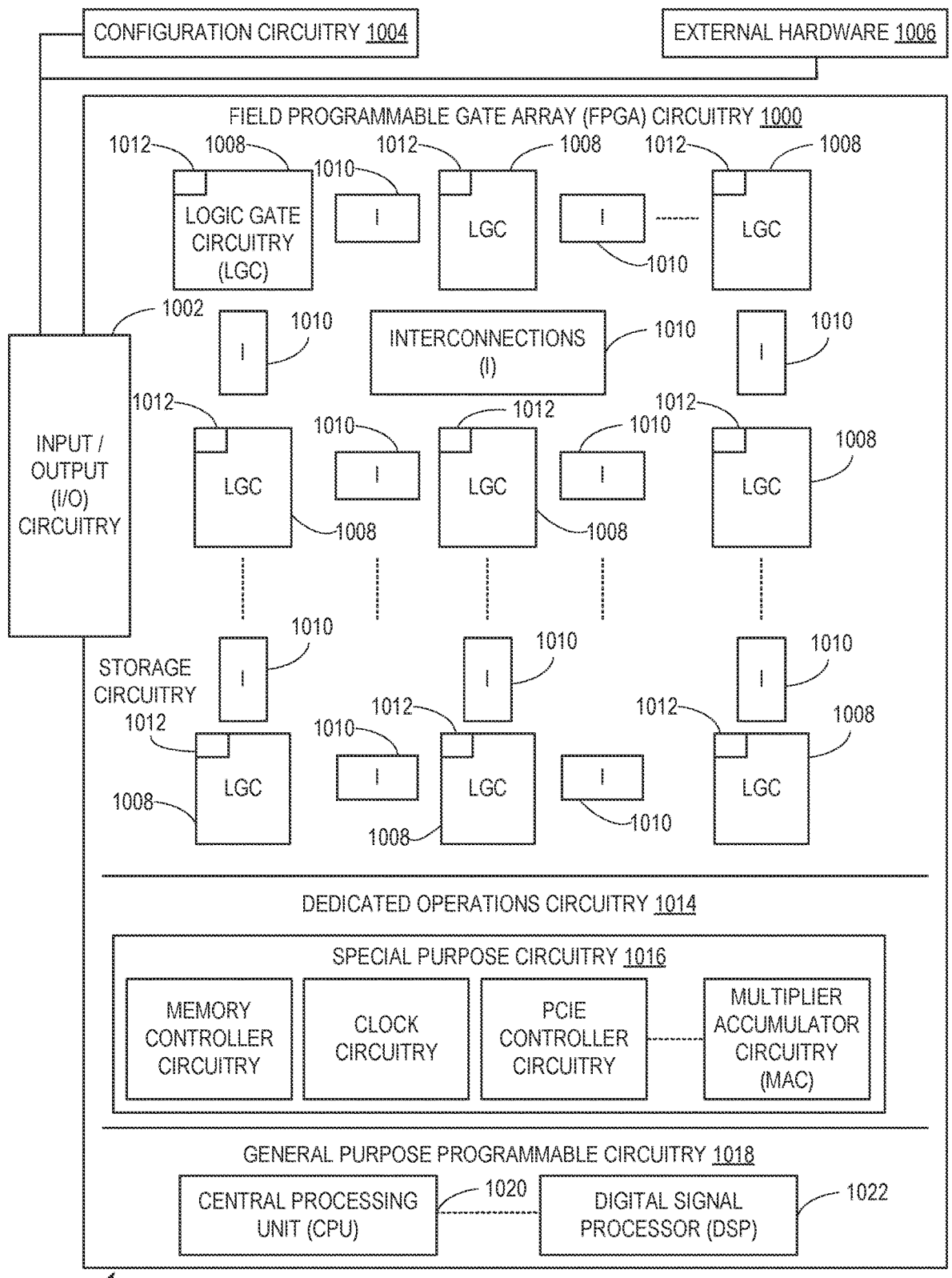
FIG. 10 is a block diagram of another example implementation of the processor circuitry of FIG. 8.

FIG. 10 is a block diagram of another example implementation of the processor circuitry 812 of FIG. 8. In this example, the processor circuitry 812 is implemented by FPGA circuitry 1000. The FPGA circuitry 1000 can be used, for example, to perform operations that could otherwise be performed by the example microprocessor 900 of FIG. 9 executing corresponding machine readable instructions. However, once configured, the FPGA circuitry 1000 instantiates the machine readable instructions in hardware and, thus, can often execute the operations faster than they could be performed by a general purpose microprocessor executing the corresponding software.

More specifically, in contrast to the microprocessor 900 of FIG. 9 described above (which is a general purpose device that may be programmed to execute some or all of the machine readable instructions represented by the flowcharts of FIGS. 4, 5, 6, and/or 7 but whose interconnections and logic circuitry are fixed once fabricated), the FPGA circuitry 1000 of the example of FIG. 10 includes interconnections and logic circuitry that may be configured and/or interconnected in different ways after fabrication to instantiate, for example, some or all of the machine readable instructions represented by the flowcharts of FIGS. 4, 5, 6, and/or 7. In particular, the FPGA 1000 may be thought of as an array of logic gates, interconnections, and switches. The switches can be programmed to change how the logic gates are interconnected by the interconnections, effectively forming one or more dedicated logic circuits (unless and until the FPGA circuitry 1000 is reprogrammed). The configured logic circuits enable the logic gates to cooperate in different ways to perform different operations on data received by input circuitry. Those operations may correspond to some or all of the software represented by the flowcharts of FIGS. 4, 5, 6, and/or 7. As such, the FPGA circuitry 1000 may be structured to effectively instantiate some or all of the machine readable instructions of the flowcharts of FIGS. 4, 5, 6, and/or 7 as dedicated logic circuits to perform the operations corresponding to those software instructions in a dedicated manner analogous to an ASIC. Therefore, the FPGA circuitry 1000 may perform the operations corresponding to the some or all of the machine readable instructions of FIGS. 4, 5, 6, and/or 7 faster than the general purpose microprocessor can execute the same.

In the example of FIG. 10, the FPGA circuitry 1000 is structured to be programmed (and/or reprogrammed one or more times) by an end user by a hardware description language (HDL) such as Verilog. The FPGA circuitry 1000 of FIG. 10, includes example input/output (I/O) circuitry 1002 to obtain and/or output data to/from example configuration circuitry 1004 and/or external hardware (e.g., external hardware circuitry) 1006. For example, the configuration circuitry 1004 may implement interface circuitry that may obtain machine readable instructions to configure the FPGA circuitry 1000, or portion(s) thereof. In some such examples, the configuration circuitry 1004 may obtain the machine readable instructions from a user, a machine (e.g., hardware circuitry (e.g., programmed or dedicated circuitry) that may implement an Artificial Intelligence/Machine Learning (AI/ML) model to generate the instructions), etc. In some examples, the external hardware 1006 may implement the microprocessor 900 of FIG. 9. The FPGA circuitry 1000 also includes an array of example logic gate circuitry 1008, a plurality of example configurable interconnections 1010, and example storage circuitry 1012. The logic gate circuitry 1008 and interconnections 1010 are configurable to instantiate one or more operations that may correspond to at least some of the machine readable instructions of FIGS. 4, 5, 6, and/or 7 and/or other desired operations. The logic gate circuitry 1008 shown in FIG. 10 is fabricated in groups or blocks. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 1008 to enable configuration of the electrical structures and/or the logic gates to form circuits to perform desired operations. The logic gate circuitry 1008 may include other electrical structures such as look-up tables (LUTs), registers (e.g., flip-flops or latches), multiplexers, etc.

The interconnections 1010 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 1008 to program desired logic circuits.

The storage circuitry 1012 of the illustrated example is structured to store result(s) of the one or more of the operations performed by corresponding logic gates. The storage circuitry 1012 may be implemented by registers or the like. In the illustrated example, the storage circuitry 1012 is distributed amongst the logic gate circuitry 1008 to facilitate access and increase execution speed.

The example FPGA circuitry 1000 of FIG. 10 also includes example Dedicated Operations Circuitry 1014. In this example, the Dedicated Operations Circuitry 1014 includes special purpose circuitry 1016 that may be invoked to implement commonly used functions to avoid the need to program those functions in the field. Examples of such special purpose circuitry 1016 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 1000 may also include example general purpose programmable circuitry 1018 such as an example CPU 1020 and/or an example DSP 1022. Other general purpose programmable circuitry 1018 may additionally or alternatively be present such as a GPU, an XPU, etc., that can be programmed to perform other operations.

Although FIGS. 9 and 10 illustrate two example implementations of the processor circuitry 812 of FIG. 8, many other approaches are contemplated. For example, as mentioned above, modern FPGA circuitry may include an on-board CPU, such as one or more of the example CPU 1020 of FIG. 10. Therefore, the processor circuitry 812 of FIG. 8 may additionally be implemented by combining the example microprocessor 900 of FIG. 9 and the example FPGA circuitry 1000 of FIG. 10. In some such hybrid examples, a first portion of the machine readable instructions represented by the flowcharts of FIGS. 4, 5, 6, and/or 7 may be executed by one or more of the cores 902 of FIG. 9, a second portion of the machine readable instructions represented by the flowcharts of FIGS. 4, 5, 6, and/or 7 may be executed by the FPGA circuitry 1000 of FIG. 10, and/or a third portion of the machine readable instructions represented by the flowcharts of FIGS. 4, 5, 6, and/or 7 may be executed by an ASIC. It should be understood that some or all of the circuitry of FIG. 3 may, thus, be instantiated at the same or different times. Some or all of the circuitry may be instantiated, for example, in one or more threads executing concurrently and/or in series. Moreover, in some examples, some or all of the circuitry of FIG. 3 may be implemented within one or more virtual machines and/or containers executing on the microprocessor.

In some examples, the processor circuitry 812 of FIG. 8 may be in one or more packages. For example, the processor circuitry 900 of FIG. 9 and/or the FPGA circuitry 1000 of FIG. 10 may be in one or more packages. In some examples, an XPU may be implemented by the processor circuitry 812 of FIG. 8, which may be in one or more packages. For example, the XPU may include a CPU in one package, a DSP in another package, a GPU in yet another package, and an FPGA in still yet another package.

Figure 11:
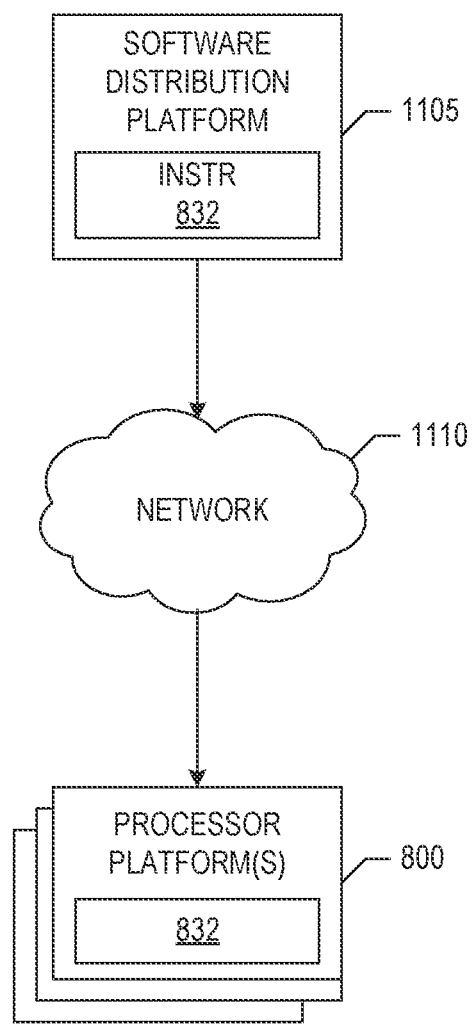
FIG. 11 is a block diagram of an example software distribution platform (e.g., one or more servers) to distribute software (e.g., software corresponding to the example machine readable instructions of FIGS. 4, 5, 6, and/or 7) to client devices associated with end users and/or consumers (e.g., for license, sale, and/or use), retailers (e.g., for sale, re-sale, license, and/or sub-license), and/or original equipment manufacturers (OEMs) (e.g., for inclusion in products to be distributed to, for example, retailers and/or to other end users such as direct buy customers).

A block diagram illustrating an example software distribution platform 1105 to distribute software such as the example machine readable instructions 832 of FIG. 8 to hardware devices owned and/or operated by third parties is illustrated in FIG. 11. The example software distribution platform 1105 may be implemented by any computer server, data facility, cloud service, etc., capable of storing and transmitting software to other computing devices. The third parties may be customers of the entity owning and/or operating the software distribution platform 1105. For example, the entity that owns and/or operates the software distribution platform 1105 may be a developer, a seller, and/or a licensor of software such as the example machine readable instructions 832 of FIG. 8. The third parties may be consumers, users, retailers, OEMs, etc., who purchase and/or license the software for use and/or re-sale and/or sub-licensing. In the illustrated example, the software distribution platform 1105 includes one or more servers and one or more storage devices. The storage devices store the machine readable instructions 832, which may correspond to the example machine readable instructions 400, 410 of FIGS. 4, 5, 6, and/or 7, as described above. The one or more servers of the example software distribution platform 1105 are in communication with a network 1110, which may correspond to any one or more of the Internet and/or any of the example networks 826 described above. In some examples, the one or more servers are responsive to requests to transmit the software to a requesting party as part of a commercial transaction. Payment for the delivery, sale, and/or license of the software may be handled by the one or more servers of the software distribution platform and/or by a third party payment entity. The servers enable purchasers and/or licensors to download the machine readable instructions 832 from the software distribution platform 1105. For example, the software, which may correspond to the example machine readable instructions 400, 410 of FIGS. 4, 5, 6, and/or 7, may be downloaded to the example processor platform 800, which is to execute the machine readable instructions 832 to implement the user presence analyzing circuitry 138 of FIG. 3. In some example, one or more servers of the software distribution platform 1105 periodically offer, transmit, and/or force updates to the software (e.g., the example machine readable instructions 832 of FIG. 8) to ensure improvements, patches, updates, etc., are distributed and applied to the software at the end user devices.

From the foregoing, it will be appreciated that example systems, methods, apparatus, and articles of manufacture have been disclosed that provide for detection of user movement(s) relative to a primary media exposure area of an environment, such as a primary viewing area, including a media presentation device. Examples disclosed herein detect changes in user movement based on sensor data collected by motion sensor(s) in the environment and automatically generate prompts or requests to verify the audience members in the primary viewing area. Some examples disclosed herein analyze image data including the primary viewing area to automatically identify the audience members in the viewing area. Examples disclosed herein dynamically generate the requests for user presence verification based on motion sensor data and, thus, can reduce disruptions to the audience members in instances in which movement is not detected. Examples disclosed herein generate audience presence data that can be used to more accurately identify the audience members who were exposed to media content during presentation of the content.

Example apparatus, systems, methods, and articles of manufacture for user presence detection for audience monitoring are disclosed herein. Further examples and combinations thereof include the following:

Example 1 includes an apparatus comprising at least one memory; instructions; and processor circuitry to execute the instructions to detect user movement relative to an area based on one or more signals output by one or more motion detection sensors, the area associated with a media presentation device; generate a request for verification of user presence in the area in response to detection of the user movement; and correlate a user input responsive to the request with media presented via the media presentation device.

Example 2 includes the apparatus of example 1, wherein the area is a first area, the one or more motion detection sensors include a first motion detection sensor in the first area and a second motion detection sensor in a second area different than the first area, and the processor circuitry is to detect the user movement based on a first signal output by the first motion detection sensor and a second signal output by the second motion detection sensor.

Example 3 includes the apparatus of examples 1 or 2, wherein the user input includes an audio input and the processor circuitry is to perform speech analysis to detect a user identifier in the audio input.

Example 4 includes the apparatus of any of examples 1-3, wherein the user input includes image data and the processor circuitry is to perform facial recognition analysis of the image data to identify a user in the area.

Example 5 includes the apparatus of any of examples 1-4, wherein to generate the request, the processor circuitry is to cause the media presentation device to display the request.

Example 6 includes the apparatus of any of examples 1-5, wherein to generate the request, the processor circuitry is to cause a flash indicator of a metering device to activate.

Example 7 includes the apparatus of any of examples 1-6, wherein the processor circuitry is to adjust a sensitivity of at least one of the one or more motion detection sensors based on the user input.

Example 8 includes an audience monitoring system comprising one or more sensors to output one or more signals indicative of movement of a user relative to an area associated with media exposure; and processor circuitry to predict a change in a presence of the user in the area based on movement data corresponding to the one or more signals; and cause an output device to output a user identification request associated with the area in response to the prediction.

Example 9 includes the audience monitoring system of example 8, wherein the processor circuitry is to compare the movement data to a user movement threshold; and detect movement of the user in the area when the movement data satisfies the user movement threshold.

Example 10 includes the audience monitoring system of examples 8 or 9, wherein the processor circuitry is to timestamp the one or more signals output by the one or more sensors.

Example 11 includes the audience monitoring system of any of examples 8-10, wherein the output device includes a media presentation device and the processor circuitry is to cause the media presentation device to display the user identification request; and identify the user or a second user based on an input received from a remote control device in response to the user identification request.

Example 12 includes the audience monitoring system of any of examples 8-11, wherein the output device includes a smart home device and the processor circuitry is to cause the smart home device to output the user identification request as an audio output.

Example 13 includes the audience monitoring system of any of examples 8-12, wherein the area is a primary area and the one or more sensors include a first sensor having a first field of view including at least a portion of the primary area and a second sensor having a second field of view including at least a portion of a second area, the second area different than the primary area, the primary area including a media presentation device.

Example 14 includes a non-transitory computer-readable storage medium comprising instructions that, when executed, cause processor circuitry to at least detect movement relative to a media exposure area based on one or more signals output by one or more motion sensors, the media exposure area including a media presentation device; cause an image sensor to generate image data in response to the movement, the image data including at least a portion of the media exposure area; perform image analysis to detect at least one of a first audience member or a second audience member in the image data; and identify the at least one of the first audience member or the second audience member as present in the media exposure area during presentation of media by the media presentation device based on the image analysis.

Example 15 includes the non-transitory computer-readable storage medium of example 14, wherein the instructions, when executed, cause the processor circuitry to cause a flash indicator to emit light at a time during generation of the image data by the image sensor.

Example 16 includes the non-transitory computer-readable storage medium of examples 15 or 16, wherein the instructions, when executed, cause the processor circuitry to cause the flash indicator to refrain from emitting light when a threshold period of time for the image sensor to collect the image data has been satisfied.

Example 17 includes the non-transitory computer-readable storage medium of any of examples 14-16, wherein the instructions, when executed, cause the processor circuitry to perform facial recognition analysis to detect the at least one of the first audience member or the second audience member.

Example 18 includes the non-transitory computer-readable storage medium of any of examples 14-17, wherein the instructions, when executed, cause the processor circuitry to cause the image sensor to stop generation of the image data when a threshold period of time for the image sensor to generate the image data has been satisfied.

Example 19 includes the non-transitory computer-readable storage medium of any of examples 14-18, wherein the movement is a first movement and the instructions, when executed, cause the processor circuitry to cause the image sensor to generate image data in response to detection of a second movement based on one or more subsequent signals output by the one or more motion sensors.

Example 20 includes the non-transitory computer-readable storage medium of any of examples 14-19, wherein the instructions, when executed, cause the processor circuitry to determine a sensitivity level for at least one of the one or more motion sensors based on detection of the at least one of the first audience member or the second audience member in the image data.

The following claims are hereby incorporated into this Detailed Description by this reference. Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

What is claimed is:

1. An apparatus comprising:
    at least one memory;
    machine-readable instructions; and
    processor circuitry to execute the machine-readable instructions to:
        detect user movement relative to an area based on one or more first signals output by one or more motion detection sensors, the area associated with a media presentation device;
        generate a first request for verification of user presence in the area based on a verification request generation rule, the first request in response to detection of the user movement;
        correlate a user input responsive to the first request with media presented via the media presentation device;
        modify the verification request generation rule based on the detection of the user movement and the user input to create a modified verification request generation rule; and
        execute the modified verification request generation rule to generate a second request for verification of user presence in the area in response to one or more second signals output by the one or more motion detection sensors, the one or more second signals output at a later time than the one or more first signals.

2. The apparatus of claim 1, wherein the area is a first area, the one or more motion detection sensors include a first motion detection sensor in the first area and a second motion detection sensor in a second area different than the first area, the one or more first signals includes a first signal output by the first motion detection sensor and a second signal output by the second motion detection sensor, and the processor circuitry is to detect the user movement based on the first signal output by the first motion detection sensor and the second signal output by the second motion detection sensor.

3. The apparatus of claim 1, wherein the user input includes an audio input and the processor circuitry is to perform speech analysis to detect a user identifier in the audio input.

4. The apparatus of claim 1, wherein the user input includes image data and the processor circuitry is to perform facial recognition analysis of the image data to identify a user in the area.

5. The apparatus of claim 1, wherein to generate the first request, the processor circuitry is to cause the media presentation device to display the first request.

6. The apparatus of claim 1, wherein to generate the first request, the processor circuitry is to cause a flash indicator of a metering device to activate.

7. The apparatus of claim 1, wherein the processor circuitry is to adjust a sensitivity of at least one of the one or more motion detection sensors based on the user input.

8. An audience monitoring system comprising:
    one or more sensors to output one or more first signals indicative of movement of a user relative to an area associated with media exposure; and processor circuitry to:
  predict a change in a presence of the user in the area based on movement data corresponding to the one or more first signals;
  cause an output device to output a first user identification request associated with the area based on a user identification request output rule, the first user identification request in response to the prediction;
  modify the user identification request output rule based on the prediction and a user input to the first user identification request to generate a modified user identification request output rule; and
  execute the modified user identification request output rule to output a second user identification request associated with the area in response to one or more second signals output by the one or more sensors, the one or more second signals output at a later time than the one or more first signals.

9. The audience monitoring system of claim 8, wherein the processor circuitry is to:
  compare the movement data to a user movement threshold; and
  detect movement of the user in the area when the movement data satisfies the user movement threshold.

10. The audience monitoring system of claim 8, wherein the processor circuitry is to timestamp the one or more first signals output by the one or more sensors.

11. The audience monitoring system of claim 8, wherein the output device includes a media presentation device and the processor circuitry is to:
  cause the media presentation device to display the first user identification request; and
  identify the user or a second user based on an input received from a remote control device in response to the first user identification request.

12. The audience monitoring system of claim 8, wherein the output device includes a smart home device and the processor circuitry is to cause the smart home device to output the user identification request as an audio output.

13. The audience monitoring system of claim 8, wherein the area is a primary area and the one or more sensors include a first sensor having a first field of view including at least a portion of the primary area and a second sensor having a second field of view including at least a portion of a second area, the second area different than the primary area, the primary area including a media presentation device.

14. A non-transitory computer-readable storage medium comprising instructions that, when executed, cause processor circuitry to at least:
  detect movement relative to a media exposure area based on one or more signals output by one or more motion sensors, the media exposure area including a media presentation device;
  execute a user presence verification rule to cause an image sensor to generate first image data in response to the movement, the first image data including at least a portion of the media exposure area;
  perform image analysis to detect at least one of a first audience member or a second audience member in the first image data;
  identify the at least one of the first audience member or the second audience member as present in the media exposure area during presentation of media by the media presentation device based on the image analysis;
  modify the user presence verification rule based on the detection of the movement and the identification of the at least one of the first audience member or the second audience member to generate a modified user presence verification rule; and
  execute the modified user presence verification rule to cause the image sensor to generate second image data in response to one or more subsequent signals output by the one or more motion sensors, the second image data to be generated at a later time than the first image data.

15. The non-transitory computer-readable storage medium of claim 14, wherein the instructions, when executed, cause the processor circuitry to cause a flash indicator to emit light at a time during generation of the first image data by the image sensor.

16. The non-transitory computer-readable storage medium of claim 15, wherein the instructions, when executed, cause the processor circuitry to cause the flash indicator to refrain from emitting light when a threshold period of time for the image sensor to collect the first image data has been satisfied.

17. The non-transitory computer-readable storage medium of claim 14, wherein the instructions, when executed, cause the processor circuitry to perform facial recognition analysis to detect the at least one of the first audience member or the second audience member.

18. The non-transitory computer-readable storage medium of claim 14, wherein the instructions, when executed, cause the processor circuitry to cause the image sensor to stop generation of the first image data when a threshold period of time for the image sensor to generate the first image data has been satisfied.

19. The non-transitory computer-readable storage medium of claim 18, wherein the movement is a first movement and the instructions, when executed, cause the processor circuitry to cause the image sensor to generate the second image data in response to detection of a second movement based on the one or more subsequent signals output by the one or more motion sensors.

20. The non-transitory computer-readable storage medium of claim 14, wherein the instructions, when executed, cause the processor circuitry to determine a sensitivity level for at least one of the one or more motion sensors based on detection of the at least one of the first audience member or the second audience member in the first image data.

* * * * *